(12) United States Patent
Ahn et al.

(10) Patent No.: US 11,934,651 B2
(45) Date of Patent: Mar. 19, 2024

(54) MOBILE TERMINAL WITH MULTIPLE SCREENS AND MAPPED COORDINATES

(71) Applicant: LG ELECTRONICS INC., Seoul (KR)

(72) Inventors: Taeoh Ahn, Seoul (KR); Taehwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 16 days.

(21) Appl. No.: 17/636,793

(22) PCT Filed: Aug. 22, 2019

(86) PCT No.: PCT/KR2019/010666
§ 371 (c)(1),
(2) Date: Feb. 18, 2022

(87) PCT Pub. No.: WO2021/033804
PCT Pub. Date: Feb. 25, 2021

(65) Prior Publication Data
US 2022/0291825 A1    Sep. 15, 2022

(51) Int. Cl.
*G06F 3/04883* (2022.01)
*H04M 1/724* (2021.01)

(52) U.S. Cl.
CPC ........ *G06F 3/04883* (2013.01); *H04M 1/724* (2021.01); *G06F 2203/04104* (2013.01)

(58) Field of Classification Search
CPC .... G06F 1/1643; G06F 1/1616; G06F 1/1618; G06F 3/0486; G06F 3/0488; G06F 3/04886; G06F 3/04883; G06F 1/1641; G06F 1/1647; G06F 2203/04104; G06F 2203/04808; H04M 1/724; H04M 1/0254;
(Continued)

(56) References Cited

U.S. PATENT DOCUMENTS

2014/0375596 A1* 12/2014 Kim ..................... G06F 1/1652
                                                    345/173

FOREIGN PATENT DOCUMENTS

| KR | 10-2012-0015624 A | 2/2012 |
| KR | 10-2014-0147473 A | 12/2014 |
| KR | 10-1539231 B1 | 7/2015 |

(Continued)

*Primary Examiner* — Yaron Cohen
(74) *Attorney, Agent, or Firm* — Birch, Stewart, Kolasch & Birch, LLP

(57) ABSTRACT

The present invention relates to a mobile terminal which has a touch screen including a plurality of regions classified by software, or which is linked to another touch screen, the mobile terminal comprising: a first touch screen for displaying screen image information about an application being executed; a communication unit for performing a communication connection with a second touch screen linked to the first touch screen; and a control unit which generates a multi-touch event by combining a first touch event formed by a first touch input and a second touch event formed by a second touch input when the second touch input is applied to either the first or second touch screen in a state in which the first touch input is applied to the other one of the first and second touch screen, and which performs a function according to the multi-touch event with respect to the screen image information displayed on the touch screen to which the first touch input has been applied.

11 Claims, 21 Drawing Sheets

(58) Field of Classification Search
CPC ........... H04M 1/0214; H04M 2250/22; H04M 2250/16
See application file for complete search history.

(56) References Cited

FOREIGN PATENT DOCUMENTS

| | | |
|---|---|---|
| KR | 10-2015-0113732 A | 10/2015 |
| KR | 10-2016-0125783 A | 11/2016 |
| KR | 10-2019-0007356 A | 1/2019 |

\* cited by examiner (a)

(b)

(c)

(a)

(b)

(a)

(b)

(c)

MOBILE TERMINAL WITH MULTIPLE SCREENS AND MAPPED COORDINATES

CROSS-REFERENCE TO RELATED APPLICATIONS

This application is the National Stage filing under 35 U.S.C. 371 of International Application No. PCT/KR2019/010666 filed on Aug. 22, 2019, which is hereby expressly incorporated by reference into the present application.

TECHNICAL FIELD

The present disclosure relates to a mobile terminal having a touch screen including a plurality of regions divided by software or interworking with another touch screen device.

BACKGROUND ART

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

Meanwhile, with the development of such mobile terminal technology, there are needs to further extend a display region. Accordingly, in recent years, mobile terminals that allow the display region to be further extended by using an external device interworking with the mobile terminal or by defining the mobile terminal in a fold type such that the mobile terminal can be folded, and a display region is disposed at an inner side of the folded portion have also appeared.

Meanwhile, as an example of the external device interworking with the mobile terminal, a case having an additional display interworking with the mobile terminal may be taken. In the case of the case having such an additional display, when the mobile terminal is mounted, the display of the mobile terminal and the additional display provided in the case may be interworked with each other to provide an extended display region.

However, when the display region is extended through an external device interworking with the mobile terminal as described above, the user generally uses the mobile terminal with both hands due to the extended display region. In this case, in general, the user holds the display of the mobile terminal with one hand and the display of the case with the other hand. In addition, when the user applies a touch to either one of the display of the mobile terminal and the display of the case, the mobile terminal recognizes each touch as a touch applied to each display to perform a function corresponding thereto. That is, since each display is a separate device, each touch is processed as an input applied to each device (mobile terminal, case).

Therefore, when the user enters touch inputs to the display of the mobile terminal and the display of the case, respectively, for a multi-touch input such as a pinch-in or pinch-out, there is a problem in that they are only identified as individual touch inputs, but the multi-touch input is not applied thereto.

In addition, in a mobile terminal having a wide display region such as a fold type, a multi-touch input may be applied according to touch inputs respectively applied from both hands of the user in case where one execution screen is displayed on an entire screen, but a touch input applied to each region may be identified as an input to an application executed in each region in case where execution screens of different applications are displayed in different regions, and there is a problem in that the multi-touch input according to the touch inputs applied from both hands of the user is not entered.

DISCLOSURE OF INVENTION

Technical Problem

An aspect of the present disclosure is to provide a mobile terminal capable of performing a multi-touch function according to touch inputs from a user holding different devices in both hands, respectively, when the touch inputs are applied to different devices in a case where a display region is extended through an external device interworking therewith, and a method of controlling the mobile terminal.

In addition, another aspect of the present disclosure is to provide a mobile terminal capable of performing a multi-touch function according to touch inputs when the touch inputs are applied to different regions of a display in a state where execution screens of different applications are displayed on the different regions, and a method of controlling the mobile terminal.

Solution to Problem

In order to achieve the foregoing and other objectives, according to an aspect of the present disclosure, a mobile terminal in accordance with an embodiment of the present disclosure may include a first touch screen that displays screen information on an executed application, a communication unit that communicates with a second touch screen interworking with the first touch screen, and a controller that combines a first touch event defined by a first touch input and a second touch event defined by a second touch input to generate a multi-touch event, and performs a function according to the multi-touch event for screen information displayed on the touch screen to which the first touch input is applied when the second touch input is applied to either one of the first and second touch screens while the first touch input is applied to the other one.

According to an embodiment, when the second touch input is applied while the first touch input is applied, the controller may map coordinates corresponding to the second touch event to the touch screen to which the first touch input is applied to combine the first touch event and the second touch event.

According to an embodiment, when a pinch-output input is defined in which a first touch input defining the first touch input and a second touch input defining the mapped second touch event are dragged in a direction away from each other, or a pinch-in input is defined in which the first and second touch inputs are dragged in a direction toward each other, the controller may enlarge or reduce an execution screen displayed on the touch screen to which the first touch input is applied according to the pinch-out input or the pinch-in input.

According to an embodiment, coordinates corresponding to the second touch event mapped to the touch screen to which the first touch input is applied may include at least one coordinates corresponding to a touch trace of a second touch input defining the second touch event.

According to an embodiment, when a second touch input is applied to either one of the first and second touch screens while a first touch input is applied to the other one, the controller may map coordinates corresponding to the second touch input as a starting point to the proximity of one point on the either one touch screen, and when the second touch event is defined from the second touch input, the controller sequentially may map at least one coordinates corresponding to a touch trace of the second touch input from the starting point.

According to an embodiment, the controller may determine the coordinates of the starting point mapped to the proximity of one point on the either one touch screen according to relative positions of the touch screen to which the first touch input is applied and the touch screen to which the second touch input is applied.

According to an embodiment, the second touch screen may be provided in a case coupled to the mobile terminal, and the case may display an execution screen of an application executed in the mobile terminal on the second touch screen interworking with the first touch screen based on a touch input applied to the first touch screen or the second touch screen.

According to an embodiment, the second touch screen may be a touch screen provided in another mobile terminal separate from the mobile terminal, on which an execution screen of the same application as that of screen information displayed on the first touch screen is displayed, and the controller may transmit information on a second touch event applied to the first touch screen to the mobile terminal having the second touch screen when the first touch input is a touch input applied to the second touch screen, and receive information on a second touch event from a mobile terminal having the second touch screen to generate the multi-touch event when the first touch input is a touch input applied to the first touch screen.

According to an embodiment, the controller may perform a function according to the multi-touch event with respect to one point on the touch screen to which the first touch input is applied, and the one point on the touch screen to which the first touch input is applied may be a point to which the first touch input is first applied.

In order to achieve the foregoing or other objectives, according to an aspect of the present disclosure, a mobile terminal according to an embodiment of the present disclosure may include a touch screen divided into a plurality of regions to display execution screens of different applications in each region, and a controller that combines a first touch input and a second touch input to generate a multi-touch event, and performs a function according to the multi-touch event with respect to one point on a first region to which the first touch input is applied when the second touch input is applied to a second region on the touch screen on which an execution screen of a second application is displayed while the first touch input is applied to the first region on the touch screen on which an execution screen of a first application is displayed.

According to an embodiment, when the second touch input is applied while the first touch input is applied, the controller may map coordinates corresponding to the second touch input to one point on the first region to combine the first touch input and the second touch input.

According to an embodiment, the coordinates corresponding to the second touch input mapped to one point on the first region may be the proximity of a point to which the first touch input is first applied in the first region.

According to an embodiment, when the first touch input and the second touch input define a pinch-in or pinch-out input, the controller may reduce or enlarge an execution screen of the first application according to the pinch-in or pinch-out input.

According to an embodiment, when a second touch input dragged in one direction is applied while the first touch input is held, screen information displayed through the execution screen of the first application may be rotated according to a direction in which the second touch input is dragged with respect to a point at which the first touch input is held.

Advantageous Effects of Invention

The effects of a mobile terminal according to the present disclosure and a control method thereof will be described as follows.

According to at least one of embodiments of the present disclosure, since the present disclosure identifies touch inputs respectively applied to touch screens provided in different devices as a single multi-touch event, there is an advantage of allowing a user to enter touch inputs respectively applied to touch screens provided in the different devices as a multi-touch input for any one touch screen.

According to at least one of embodiments of the present disclosure, since the present disclosure identifies touch inputs respectively applied to different display regions in which execution screens of different applications are displayed as a single multi-touch event, there is an advantage of allowing the user to enter touch inputs respectively applied to the different display regions as a single multi-touch input to any one application.

MODE FOR THE INVENTION

Figure 1:
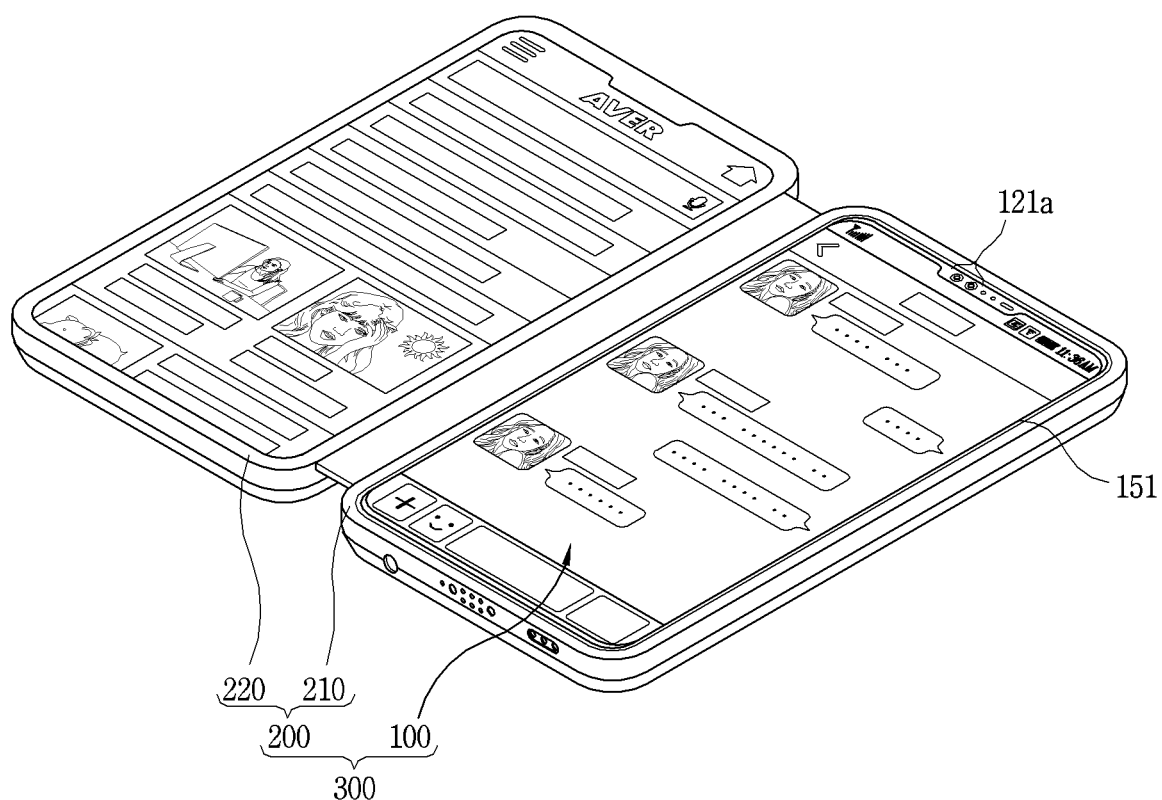
FIGS. 1 and 2 are conceptual views for explaining an electronic device according to the present disclosure.
Figure 2:
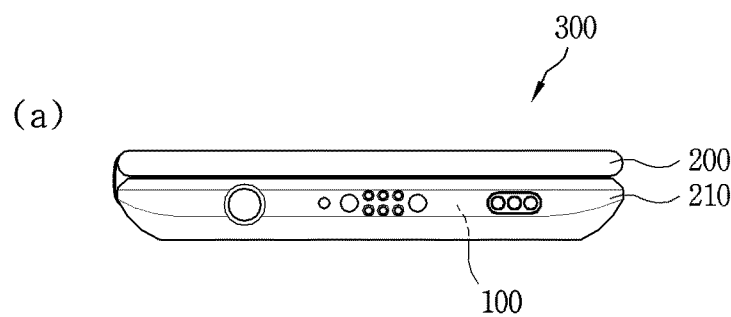
Figure 2:
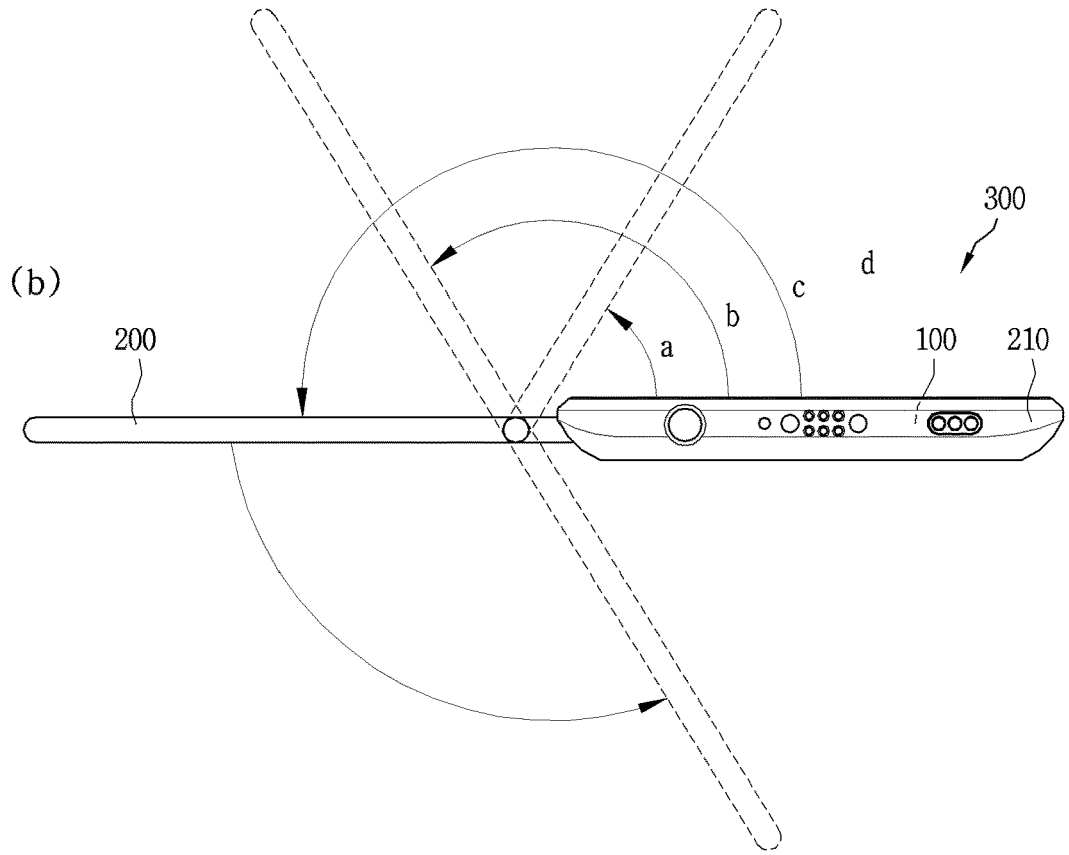
Figure 2:
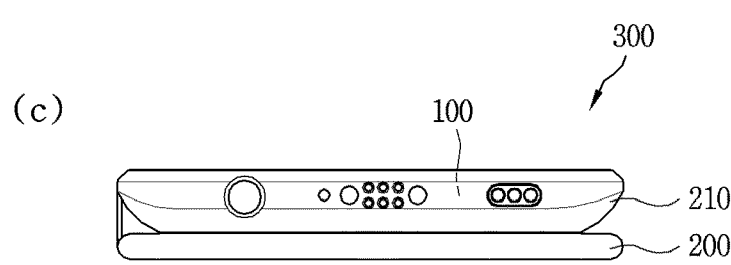

Hereinafter, FIGS. 1 and 2 are conceptual views for explaining a mobile terminal and a case mounted on the mobile terminal according to the present disclosure.

Referring to the drawings, a mobile terminal 100 is coupled to a case 200, and the mobile terminal 100 and the case 200 are coupled to constitute one electronic device 300.

In this case, the mobile terminal may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra-books, wearable devices (for example, smart watches, smart glasses, head mounted displays (HMDs)), and the like. Details of the mobile terminal will be described later with reference to FIG. 3.

The case 200 may be a pouch that protects outer surfaces of the mobile terminal 100 or covers or accommodates at least one surface of the mobile terminal 100 as an accessory of the mobile terminal 100. The case 200 may be configured to expand a function of the mobile terminal 100 in combination with the mobile terminal 100.

Meanwhile, in the present disclosure, information output from the mobile terminal may be processed in association with a structure or a function of the case 200. For example, referring to FIG. 1, the case 200 may include a display (hereinafter, referred to a second display 250) interworking with a display (hereinafter, a first display 151) of the mobile terminal.

The case may include a first body 210 and a second body 220 that are rotatably connected to each other, and the display 250 may be disposed on any one of the first body 210 and the second body 220.

For example, the first body 210 may be disposed to accommodate at least a portion of the mobile terminal body. As a rear side of the mobile terminal is accommodated in the first body 210, and the first display 151 disposed on a front side of the mobile terminal is exposed outside.

In addition, there may be provided at least one hole at one side of the first body 210, so that at least a part of components of the mobile terminal exposed outside the case performs a function when the mobile terminal 100 is coupled to the first body 210.

Here, the mobile terminal 100 may be detachably coupled to the first body 210. In addition, the mobile terminal may be configured to detect whether the mobile terminal is coupled to the first body 210. For the detection, the first body 210 may include a magnet 245 at one side thereof facing the mobile terminal 100, and the mobile terminal may include a hall sensor 143 at the rear side thereof which is configured to sense a magnetic field corresponding to the magnet 245 when the mobile terminal is coupled to the first body. When the magnetic field is sensed by the hall sensor, the mobile terminal may recognize that it is coupled to the case, and then perform preset condition control.

For example, when a magnetic field is sensed by the hall sensor 143, a controller 180 of the mobile terminal 100 may supply an operating current to the second display 250 provided on the second body 220 or perform a preparation process into a state capable of transmitting a signal to the second display 250. That is, the predetermined control may refer to an operation related to the preparation process.

Here, the 'preparation process' denotes a standby state in which the controller of the mobile terminal 100 can immediately perform a next process when an operating current is supplied to the second display 250. Therefore, even if the magnetic field is sensed by the hall sensor 143, a current is not immediately supplied to the second display 250.

Meanwhile, when it is detected that a connector provided at one side of the first body 210, for example, at a lower end of the first body 210 and a connection port provided at a lower end of the mobile terminal accommodated in the first body 210 are mutually coupled, the controller 180 of the mobile terminal may supply an operating current to the second display 250 provided on the second body 220.

Specifically, an operating current may be supplied from a battery of the mobile terminal 100 to a circuit board on the second display 250 through a flexible printed circuit board (FPCB) connected by the connector and a wiring portion (e.g., a coaxial cable) provided in a connection portion 230 of the case 200.

To this end, the controller 180 of the mobile terminal may be configured to recognize resistances Ra, Rd in the first body 210 through a specific contact pin of the connector provided in the first body 210, detect a coupling of the connector and the connection port, and accordingly supply an operating current. This will be described in more detail below.

The second display 250 provided on the second body 220 may be configured to operate based on power supplied from the mobile terminal 100.

The second display 250 may be disposed on the second body 220 to extend a display region of the first display 151 or may be operated independently of the first display 151. For example, contents related to information outputted on the first display 151 may be mirrored to be outputted on the second display 250.

In addition, execution screens of different applications may be outputted on the first display 151 and the second display 250, respectively. As another example, an execution screen of one application may be divided and outputted on the first display 151 and the second display 250. Also, screens corresponding to different execution steps or different tasks of one application may be outputted on the first display 151 and the second display 250.

Furthermore, the mobile terminal 100 is configured to control screen information output to the second display 250, and for this purpose, a communication link for wired communication (e.g., a USB 2.0 communication link) may be established between the mobile terminal 100 and the second display 250.

Meanwhile, both the first display 151 and the second display 250 are exposed outside in open state, and the open state may be defined with reference to FIG. 2.

Referring to FIG. 2, the first body 210 and the second body 220 of the case 200 may rotate with respect to each other between a closed state in (a) of FIG. 1B and a flip state in (c) of FIG. 2.

The closed state is the state in (a) of FIG. 2, wherein the first body 210 of the case 200 is covering the first display 151 of the mobile terminal 100. Here, the first display 151 is covered by the first body 210. That is, the closed state may be a state in which the first display 151 is covered by the second display 250. In the closed state, the mobile terminal 100 and the case 200 overlap each other in a thickness direction of the mobile terminal, and thus form a diary-like shape, thereby improving user portability.

In the closed state, a body of the mobile terminal 100 accommodated in the first body 210 may not be exposed outside. In addition, in the closed state, a sub-display 250a to display notification information corresponding to a specific event occurring in the mobile terminal 100 may be exposed from one side of a front surface of the second body 220 including the second display 250.

In the closed state, the second body 220 is rotated relative to the first body 210 to be changed to the open state. The open state is a state in which the first display is not covered by the second display 250, and between the first display 151 and the second display 250 forms a specific angle other than 0 degrees.

Specifically, the open state may be one of a 'first state' in which the first display 151 and the second display 250 form about 60 degrees (a), a 'second state' in which the first display 151 and the second display 250 form about 120 degrees (b), a 'third state' in which the first display 151 and the second display 250 form about 180 degrees (c), and a 'fourth state' in which the first display 151 and the second display 250 form about 270 degrees (d), as illustrated in (b) of FIG. 1B.

In the open state, the first body 210 and the second body 220 may be fixed at a specific angle to become any one of the first to fourth states, and a fixing member to fix the bodies at a specific angle may be provided in the case 200.

The controller 180 of the mobile terminal may control the mobile terminal to perform different operation modes in any one of the first to fourth states. For example, in the first state, the mobile terminal may operate in a 'privacy protection mode', and in the second state, the mobile terminal may operate in a 'laptop mode'. In addition, in the third state, the mobile terminal may operate in a 'display extension mode', and in the fourth state, may operate in a 'multi-display mode'.

A state in which the first display 151 and the second display 250 are exposed outside is defined as the 'open state'. In the 'open state', the first display 151 is not covered by the second display 250. Accordingly, a state in which the first display 151 is covered by the second display 250 is defined as the 'closed state'. The open state and the closed state may be distinguished by a sensing value of an illuminance sensor provided on a front surface of the first display 151.

Meanwhile, as illustrated in (c) of FIG. 2, a state in which the first display 151 and the second display 250 rotate with respect to each other by 360 degrees such that a rear surface of the first body 210 on which the first display 151 is disposed is completely covered by a rear surface of the second body 220 on which the second display 250 is disposed may be defined as a 'flip state' in the open state. In the 'flipped state', the first display 151 and the second display 250 are exposed outside to face opposite directions to each other.

In the flip state, components provided on the rear surface of the mobile terminal 100 coupled to the first body 210, for example, the rear camera 121b, the optical output module 154, and the flash 124, the user input unit 123a may be detected by recognizing a state covered by the rear surface of the second body 220.

In addition, the first state to the fourth state, and the flip state may be detected by a separate sensor provided in the connection portion 230 that couples the first and second bodies 210, 220 to be relatively rotatable or separate sensors provided on rear surfaces of the first and second bodies 210, 220.

The electronic device 300 of the present disclosure may perform an operation of controlling the first display 151 and the second display 250 interworking with the open state and closed state. As an example, when the first display 151 and the second display 250 are operated in inactive state in the closed state and are changed from the closed state to the open state, at least one of the first display 151 and the second display 250 may be activated.

As an example, when changed to the open state, both the first display 151 and the second display 250 may be changed to active state. Here, different home screen pages may be output to the first display 151 and the second display 250, respectively, or identical home screen pages may be displayed on the first display 151 and the second display 250. In addition, various information may be outputted on the first display 151 and the second display 250 according to circumstances.

As another example, when changed to the open state, the first display 151 is switched to active state, and the second display 250 may be maintained in the inactive state.

The second display 250 may include a touch sensor configured to sense a touch applied to the second display 250. Also, the second display 250 may sense a touch even in the inactive state.

In relation to the touch sensed by the touch sensor, the second display 250 may be operated in active state when a preset type of touch is applied to the second display 250 in the open state. Alternatively, the second display 250 may be operated in active state based on a touch applied to the first display 151 in the open state.

Meanwhile, when a touch is applied to the second display 250, the second display 250 may transmit a touch signal corresponding to the touch to the mobile terminal 100. Then, when the touch according to the received touch signal corresponds to a preset type of touch, the mobile terminal 100 may transmit a signal corresponding to a control command to activate the second display 250 to the second display 250 side.

Then, the second display 250 or the controller of the second display 250 may be activated based on the signal received from the mobile terminal 100. Furthermore, the transmission and reception of the signal may be performed by a wired communication method combining the connector provided on one side of the first body 210 and the connection port provided on the mobile terminal 100.

Figure 3A:
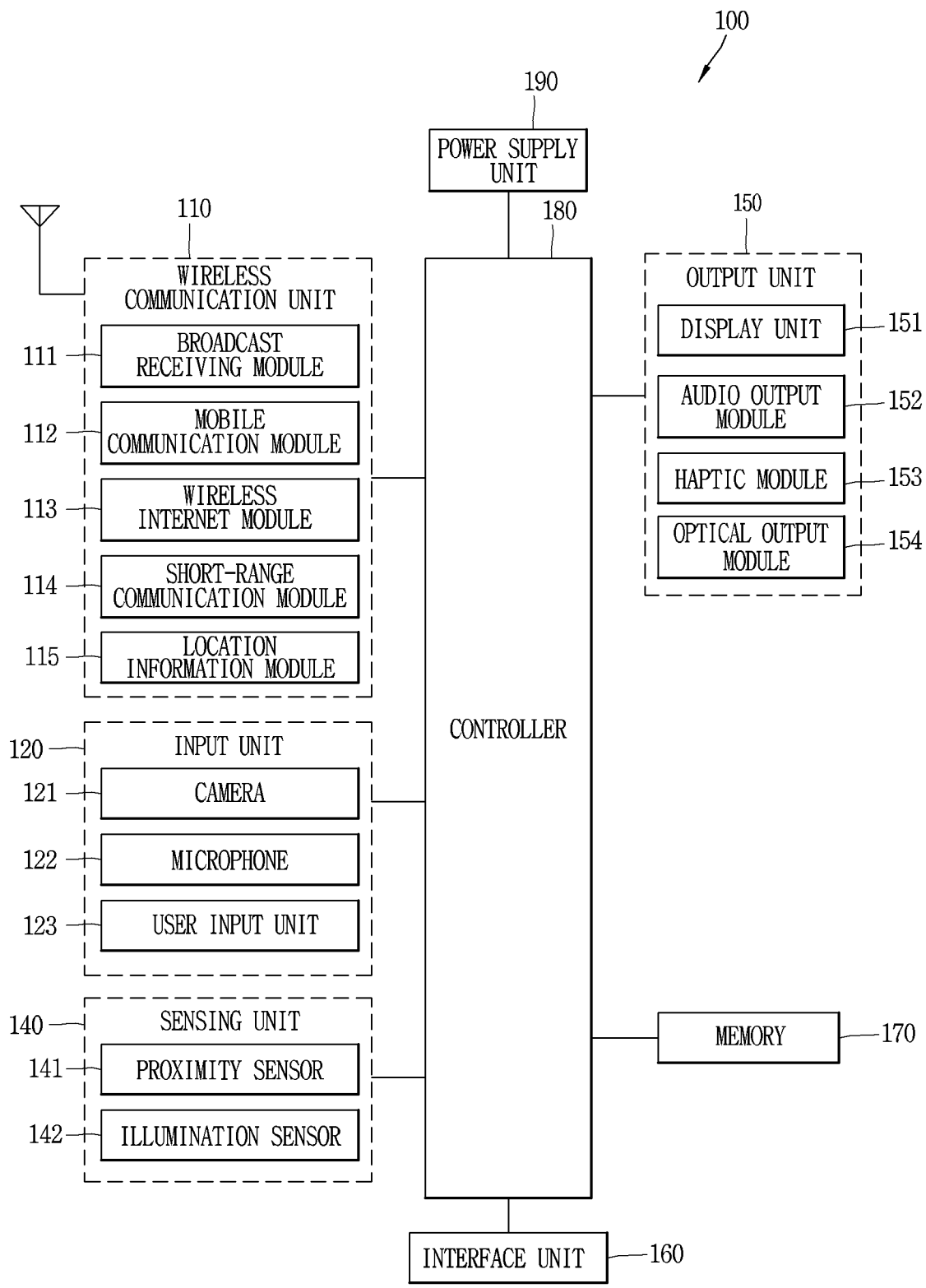
FIGS. 3A, 3B and 3C are conceptual views for explaining an example of a mobile terminal related to the present disclosure.
Figure 3B:
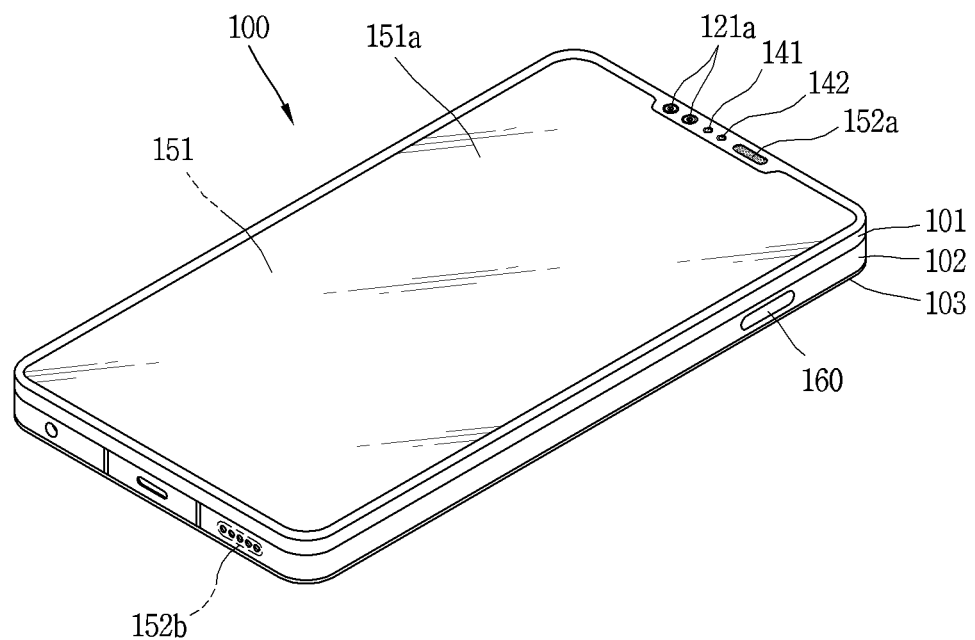
Figure 3C:
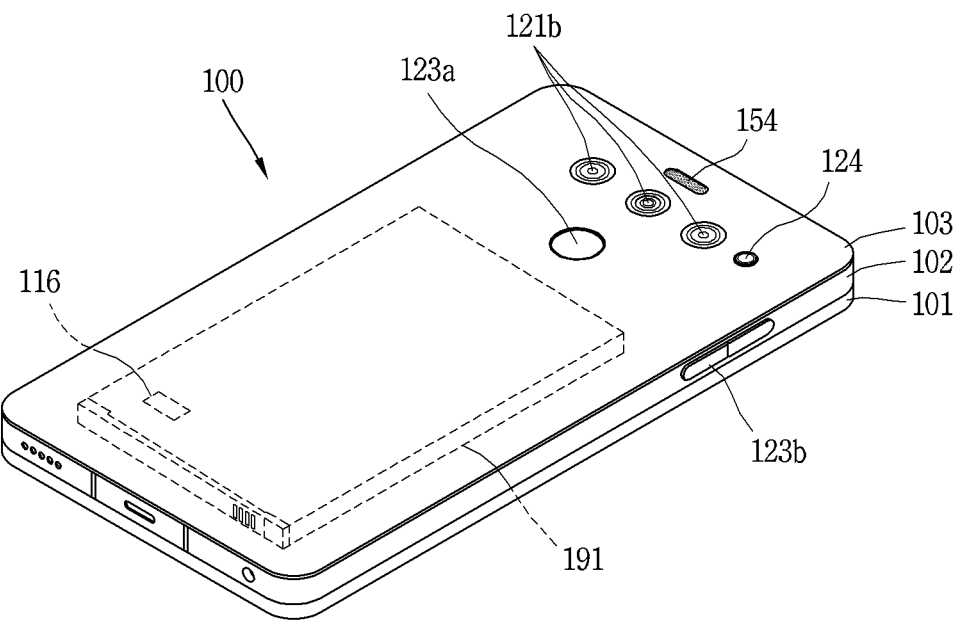

FIGS. 3A, 3B and 3C are conceptual views for explaining an example of a mobile terminal related to the present disclosure. The mobile terminal 100 according to the present disclosure may be coupled to a case of the electronic device described above.

Referring to FIGS. 3A through 3C, FIG. 3A is a block diagram for explaining a mobile terminal associated with the present disclosure, and FIGS. 3B and 3C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. The components shown in FIG. 3A are not essential for implementing a mobile terminal, and thus the mobile terminal described herein may have more or fewer components than those listed above.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display 151, an audio output module 152, a haptic module 153, an optical output module 154, and the like. The display module 151 may have an inter-layered structure or an integrated structure with a touch sensor in order to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 3A, prior to explaining various exemplary embodiments implemented by the mobile terminal 100 having the configuration.

First, referring to the wireless communication unit 110, the broadcast receiving module 111 of the wireless communication unit 110 receives a broadcast signal and/or broadcast-related information from an external broadcast management server through a broadcast channel. The broadcast channel may include a satellite channel and/or a terrestrial channel. Two or more broadcast receiving modules may be provided to the mobile terminal 100 for simultaneous broadcast reception or broadcast channel switching for at least two broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wipro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), capable of exchanging (interworking) data with the mobile terminal 100. The short-range communication module 114 may sense (or recognize) a wearable device capable of communicating with the mobile terminal 100 in the vicinity of the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 denotes a module for detecting or calculating a position of the mobile terminal. An example of the location information module 115 may include a Global Position System (GPS) module or a Wireless Fidelity (WiFi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

The input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes an image frame, such as still picture or video, acquired by an image sensor in a video phone call or image capturing mode. The processed image frames may be displayed on the display 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include various noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As an example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others.

As an example, the touch sensor may be configured to convert changes of pressure applied to a specific part of the display 151 or a capacitance generated from a specific part of the display 151, into electric input signals. The touch sensor may be configured to detect a position, an area where a touch object applying a touch onto the touch screen is touched on the touch sensor, a pressure at the time of touch, a capacitance at the time of touch, and the like. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. Meanwhile, the controller 180 may calculate the location of a wave generating source through information sensed from the optical sensor and the plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display 151 displays (outputs) information processed by the mobile terminal 100. For example, the display 151 may display execution screen information of an application program driven in the mobile terminal 100 or user interface (UI) and graphic user interface (GUI) information in response to the execution screen information.

Furthermore, the display 151 may also be implemented as a stereoscopic display for displaying stereoscopic images.

The stereoscopic display may employ a stereoscopic display scheme such as stereoscopic scheme (a glass scheme), an auto-stereoscopic scheme (glassless scheme), a projection scheme (holographic scheme), or the like.

The audio output unit 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. A device having the identification module (hereinafter, an "identification device") may be fabricated in the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may execute or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as an example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring now to FIGS. 3B and 3C, the mobile terminal 100 is described with reference to a bar-type terminal body. However, the present disclosure may not be necessarily limited thereto, and may be also applicable to various structures such as a watch type, a clip type, a glasses type, a folder type in which two or more bodies are coupled to each other in a relatively movable manner, a flip type, a slide type, a swing type, a swivel type, and the like. The present disclosure relates to a specific type of mobile terminal, but the description of a specific type of mobile terminal may be also applicable to another type of mobile terminal in general.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space disposed between the front case 101 and the rear case 102. At least one middle case may be additionally disposed between the front case 101 and the rear case 102.

The display 151 may be disposed on a front surface of the terminal body to output information. As illustrated, a window 151a of the display module 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may be provided with an opening portion for exposing the camera 121b, the optical output module 154, the flash 124, the rear input unit 123a, and the like to the outside.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The mobile terminal 100 may include a display 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160, and the like.

Hereinafter, as illustrated in FIGS. 1B and 1C, the mobile terminal 100 will be described as an example in which the display 151, the first audio output module 152a, the proximity sensor 141, the illumination sensor 142, and the first camera 121a are disposed on a front surface of the terminal body, the second manipulation unit 123b, the second audio output module 152b, the microphone 122, and the interface unit 160 are disposed on a side surface of the terminal body, and the optical output module 154, the manipulation unit 123a, the second camera 121b, and the flash 124 are disposed on a rear surface of the terminal body.

However, the foregoing configuration may not be necessarily limited to the arrangement. The foregoing configuration may be excluded, substituted or disposed on another surface if necessary. For example, the manipulation unit may not be disposed on the front surface of the terminal body, and the second audio output module 152b may be disposed on the rear surface other than the side surface of the terminal body.

The display 151 displays (outputs) information processed by the mobile terminal 100. For example, the display 151 may display execution screen information of an application program driven in the mobile terminal 100 or user interface (UI) and graphic user interface (GUI) information in response to the execution screen information.

The display 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display 151 may be implemented in two or more in number according to a configured aspect of the mobile terminal 100. For instance, a plurality of the displays 151 may be arranged on one surface to be spaced apart from or integrated with each other, or may be arranged on different surfaces.

The display module 151 may include a touch sensor which senses a touch onto the display module 151 so as to receive a control command in a touching manner. When a touch is input to the display 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may form a touch screen together with the touch sensor. Here, the touch screen may serve as the user input unit 123 (see FIG. 3A). In some cases, the touch screen may replace at least some of the functions of the user manipulation unit.

The first audio output module 152*a* may be implemented as a receiver for transferring voice sounds to the user's ear and the second audio output module 152*b* may be implemented in the form of a loud speaker for outputting various alarm sounds or multimedia reproduction sounds.

The window 151*a* of the display 151 may include a sound hole for emitting sounds generated from the first audio output module 152*a*. Here, the present disclosure may not be limited to this. It may also be configured such that the sounds are released along an assembly gap between the structural bodies (for example, a gap between the window 151*a* and the front case 101). In this case, a hole independently disposed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user has checked a generated event, the controller 180 may control the optical output module 154 to stop the light output.

The first camera 121*a* may process video frames such as still or moving images acquired by the image sensor in a video call mode or a capture mode. The processed video frames may be displayed on the display 151 or stored in the memory 170.

The manipulation units 123*a* and 123*b* are examples of the user input unit 123, which may be manipulated by a user to input a command for controlling the operation of the mobile terminal 100. The manipulation units 123*a* and 123*b* may employ any method if it is a tactile manner allowing the user to perform manipulation with a tactile feeling such as touch, push, scroll or the like. In addition, the manipulation units 123*a* and 123*b* may also employ a method of allowing the user to perform manipulation without a tactile feeling through a proximity touch, a hovering touch, or the like.

The manipulation unit 123*a* may be configured with a mechanical key, or a combination of a touch key and a push key. In addition, the manipulation unit 123*a* may be configured in a layered form with a fingerprint sensor.

The content input by the manipulation units 123*a* and 123*b* may be set in various ways. For example, the first and the second manipulation units may receive a command such as menu, home key, cancel, search, or the like, and may receive a command, such as controlling a volume level being output from the first or second audio output module 152*a* or 152*b*, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152*a* or 152*b*, switching into a touch recognition mode of the display 151, or the like. The rear input unit may be implemented into a form allowing a touch input, a push input or a combination thereof.

The rear input unit may be disposed to overlap with the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123*a* located on the front surface of the terminal body. Accordingly, when the first manipulation unit 123*a* is not disposed on the front surface of the terminal body, the display 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger recognition sensor may be integrated into the display 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may also be arranged in a matrix configuration. The cameras may be referred to as an 'array camera.' When the second camera 121*b* is implemented as the array camera, images may be captured in various manners using the plurality of lenses and images with better qualities may be obtained.

A flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement a stereo function in conjunction with the first audio output module 152*a*, and may be also used to implement a speakerphone mode during a call.

At least one antenna for wireless communication may be disposed on the terminal body. The antenna may be installed in the terminal body or disposed on the case. For example, an antenna which configures a part of the broadcast receiving module 111 (see FIG. 3A) may be retractable into the terminal body. Alternatively, an antenna may be disposed in a form of film to be attached onto an inner surface of the rear cover 103 or a case including a conductive material may serve as an antenna.

A power supply unit 190 (see FIG. 3A) for supplying power to the mobile terminal 100 may be disposed on the terminal body. The power supply unit 190 may include a battery 191 which is mounted in the terminal body or detachably coupled to an outside of the terminal body.

The battery 191 may receive power via a power source cable connected to the interface unit 160. Furthermore, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display 151 to extend the function of the mobile terminal 100. Another example of the accessory may be a touch pen for assisting or extending a touch input onto a touch screen.

Meanwhile, the electronic device according to the present disclosure is configured in such a manner that the connection port of the interface unit 161 provided on one side (e.g., lower end of side surface) of the mobile terminal, that is, the first wired communication unit 161 and the connector provided at one side of the first body 210 of the case 200, i.e., the second wired communication unit 243 are combined together to supply power and to perform wired communication for transmission and reception of various signals.

Here, it has been described that the wired communication is performed using a USB I/O interface standard. However, it is not limited thereto, and it should be noted that other interface standards for wired communication may be applied.

Figure 4:
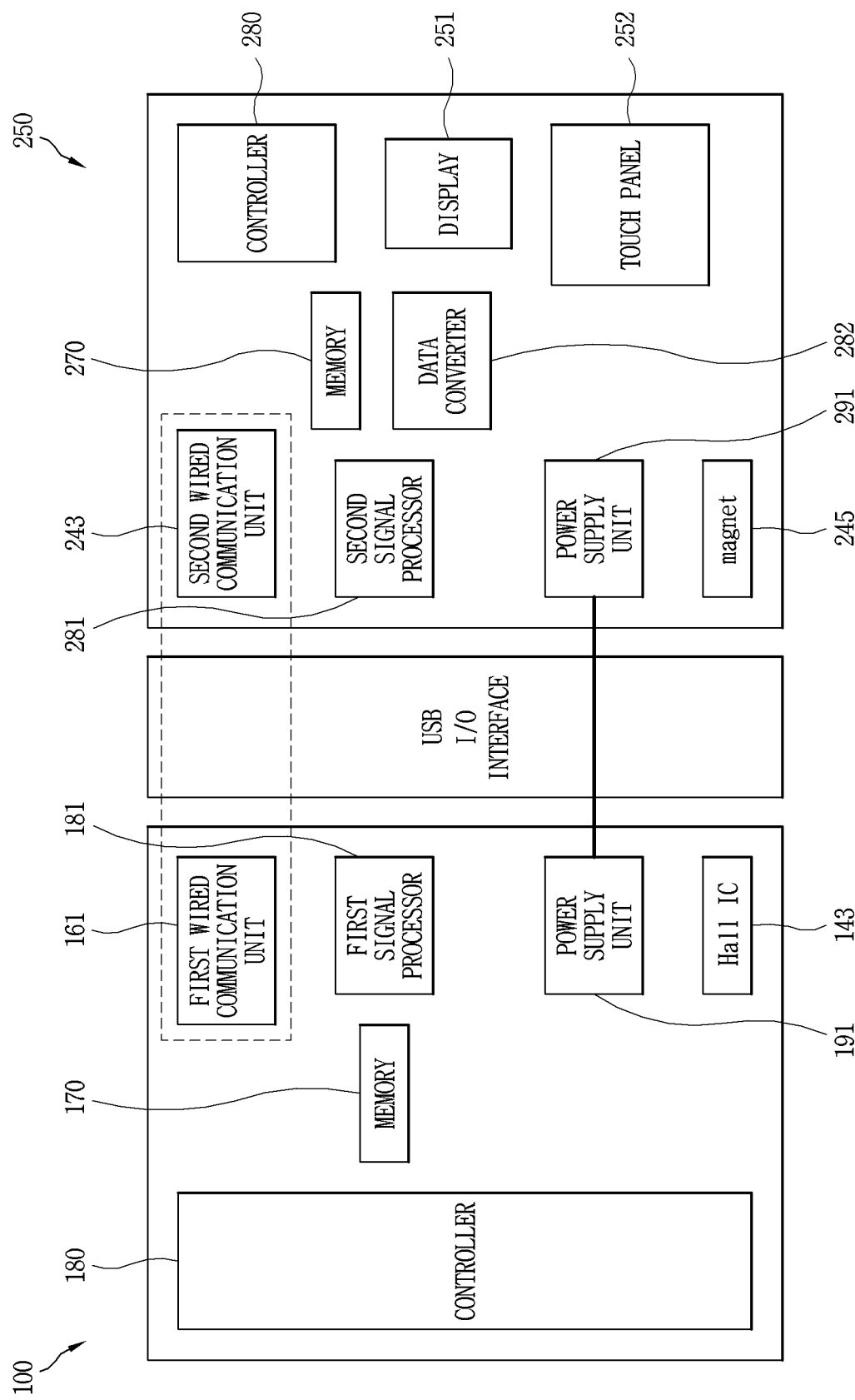
FIG. 4 is a block diagram for explaining a control method between a mobile terminal and a display provided in a case in an electronic device according to the present disclosure.

Hereinafter, a method for performing wired communication between the first wired communication unit 161 and the second wired communication unit 243 will be described in more detail with reference to the accompanying drawings. FIG. 4 is a conceptual view for explaining a control method between a mobile terminal and a display provided in a case in an electronic device according to present disclosure.

The mobile terminal 100 according to the present disclosure may be coupled to the first body 210, and when the mobile terminal 100 is coupled to the first body 210, the connector provided in the first body 210 is inserted into the connection port provided in the mobile terminal 100, and wired communication may be performed through the first and second wired communication units 161, 243.

At this time, the first body 210 on the case side becomes a host device of the mobile terminal, and may perform wired communication, for example, USB communication, with the mobile terminal 100.

The first wired communication unit 161 provided in the mobile terminal 100 may be included in the interface unit 160 described with reference to FIG. 3A. The interface unit 160 includes a plurality of contact pins, and is configured to identify a host device connected to the contact pins by the controller 180 of the mobile terminal.

The first wired communication unit 161 may be provided on a side surface of the lower end of the mobile terminal 100. In addition, the second wired communication unit 243 may be provided to correspond to a position in contact with the first wired communication unit 161 when the mobile terminal 100 is accommodated in the first body 210 of the case. That is, the second wired communication unit 243 may be provided on a side surface of the lower end of the first body 210.

In the present disclosure, when the mobile terminal 100 is accommodated in the first body 210, and the connector pin of the second wired communication unit 243 provided in the first body 210 is inserted into the port of the first wired communication unit 161 of the mobile terminal, wired communication, for example, USB I/O communication, may be performed through the first wired communication unit 161 and the second wired communication unit 243.

Accordingly, the mobile terminal 100 may supply an operating current to the second display 250 through the USB I/O interface, and transmit a control signal or an image signal. Also, in the second display 250, a touch signal may be transmitted to the mobile terminal 100 through the USB I/O interface to process the touch signal corresponding to the touch input applied to the second display 250.

Meanwhile, supply of the above-described operating current and transmission of the control signal and the image signal may be performed through different wired communication paths. To this end, the first wired communication unit 161 and the second wired communication unit 243 may include a plurality of connector pins, and may be set to use different contact pins according to the type of the transmitted signal.

Since the second wired communication unit 243 is inserted into the first wired communication unit 161 and coupled to the case, a plurality of contact pins molded in the second wired communication unit 243 is exposed to the outside. In the present disclosure, a structure in which the plurality of contact pins includes, for example, 12 pins has been described as an example.

Meanwhile, although not illustrated, the first and second wired communication units 161, 243 may have a waterproof member (not shown) molded together with the plurality of contact pins to prevent fluid from outside or to prevent fluid from moving inside. In addition, the waterproof member may be replaced with an O-ring having an elastic force.

The second wired communication unit 243 provided in the first body 210 is configured to transmit and receive wired data from the mobile terminal to the second display 250 through the wiring portion 242 included in the connection portion 230. In addition, the second wired communication unit 243 may communicate with the first wired communication unit 161 to perform unidirectional communication (data flow from the mobile terminal 100 to the second display 250) or bidirectional communication (bidirectional data flow between the mobile terminal 100 and the second display 150).

The first and second wired communication units 161, 243 according to the present disclosure may include a contact-type connector method. For example, the contact-type connector method may include a USB-C type connector or a lightning cable method.

In addition, the first wired communication unit 161 and the second wired communication unit 243 may be configured to transmit and receive various types of data in a wired communication method. For example, it may be one of graphic data, audio data, video data, touch event data, data related to control, and a combination thereof.

Meanwhile, the second display 250 provided in the second body 220 may be configured to operate based on power supplied from the power supply unit 191 of the mobile terminal 100.

Meanwhile, the mobile terminal 100 may be detachably coupled to the first body 210. In addition, the mobile terminal may be configured to detect whether the mobile terminal is coupled to the first body 210. For the detection, the first body 210 may include a magnet 245 at one side thereof facing the mobile terminal 100, and the mobile terminal may include a hall sensor 143 at the rear side thereof which is configured to sense a magnetic field corresponding to the magnet 245 when the mobile terminal is coupled to the first body. When the magnetic field is sensed by the hall sensor, the mobile terminal may recognize that it is coupled to the case, and then perform predetermined control.

Here, the preset control does not denote supplying an operating current as described above.

When the first and second wired communication units 161, 234 are connected to enable mutual communication, the mobile terminal 100 may recognize a plurality of resistances Ra, Rd disposed in the first body 210 by specific contact pins (e.g., CC1, CC2) among a plurality of contact pins included in the first wired communication unit 161 provided in the first body 210. When the plurality of resistances are recognized as described above, an operating current is supplied to the second display 250 by supplying the power, for example, Vconn to CC1.

When an operating current is supplied to the second display 250, a system of the second display 250 is booted and initialized, and becomes an operable standby state.

Here, the second display 250 is either in active state or in inactive state, and even when the second display 250 is inactive, a touch sensor (or a touch panel 252) provided in the second display 250 is operated in an active state to sense a touch applied to the second display 250.

On the other hand, when the second display 250 is activated, the controller of the mobile terminal 100 transmits an image signal corresponding to screen information to be displayed on the display 251 provided on the second display 250 to the second wired communication unit 243 side through the first wired communication unit 161. Here, the wired communication path of the video signal may be different from the wired communication path for power supply. For example, the power may be supplied to the second display 250 through a wired communication path through the CC1 pin provided in the second wired communication unit 243, and the image signal may be transmitted to the second display 250 through a wired communication path through the USB SS1 and SS2 pins.

Data may be received from the first wired communication unit 161 to the second display 250 through the second wired communication unit 243. Here, a digital image signal may convert the data into a form that can be outputted on the second display 250 through a data converter 282. For example, the second display 250 may be configured as an LCD panel. And here, the digital image signal of a DP format received from the mobile terminal 100 may be converted into a data format (MIPI format) that can be received on the LCD panel through the data converter 282 to be transferred and outputted on the display 251.

Meanwhile, data transmitted and received through the first wired communication unit 161 and the second wired communication unit 243 may be transmitted and received using different contact pins in the USB I/O interface according to a type of the data. Specifically, for example, the image signal may be transmitted and received from the mobile terminal 100 to the second display 250 through a USB SSPHY pin, and may be converted into a format that can be outputted on the second display 250 (e.g., MIPI format) through the data converter 282. In addition, for example, a control signal related to the operation of the second display 250 may be transmitted and received to the second display 250 through an external display port (EDP) AUX pin.

Signals that need to be transmitted between the mobile terminal 100 and the display 250, such as communication control signals, touch signals, and brightness control signals, can be transmitted and received through a first and a second signal processor 181, 281 using a second USB human interface device (HID) communication.

Here, in the mobile terminal 100 in an initial state, the first signal processor 181 transmits and receives signals through the first USB communication by using A6 and A7 pins on an A side, and B6 and B7 pins on a B side of the connector. Meanwhile, the first and second wired communication units 161, 234 are connected to enable mutual communication, and when a plurality of resistances Ra, Rd is recognized through the CC1 pin, they are switched by switches and the A side pins and B side pins used in the initial state are separated to transmit and receive signals by using the second USB communication only using B6 and B7 pins on the B side.

As described above, when switches are switched to process signals by using the second USB communication, the first and second signal processors 181, 281 may perform 120 conversion by USB human interface device (HID) communication to perform an operation corresponding to a touch applied to the second display 250, for example, transmission of a touch signal corresponding to the touch. Also, the first and second signal processors 181, 281 may support hot plug detect (HPD) communication between the controller 280 and the data converter 282 through the second USB communication.

Meanwhile, initialization of the second display 250 may be controlled by the controller 280 included in the second display 250.

As aforementioned, the mobile terminal according to the present disclosure may control information output to the display 250 provided in the case 200. That is, the operation of the second display 250 may be controlled by the mobile terminal 100. To this end, the case 200 to which the mobile terminal is coupled may be identified when the connection port of the mobile terminal and the connector provided in the case 200 are connected and a plurality of resistances are recognized. Therefore, since there is no need to provide a separate chip for communication between the mobile terminal and the case 200 in the present disclosure, the case 200 is compatible with various models of mobile terminals, cost can be saved, and a thickness of the case 200 can be thinner.

Figure 5:
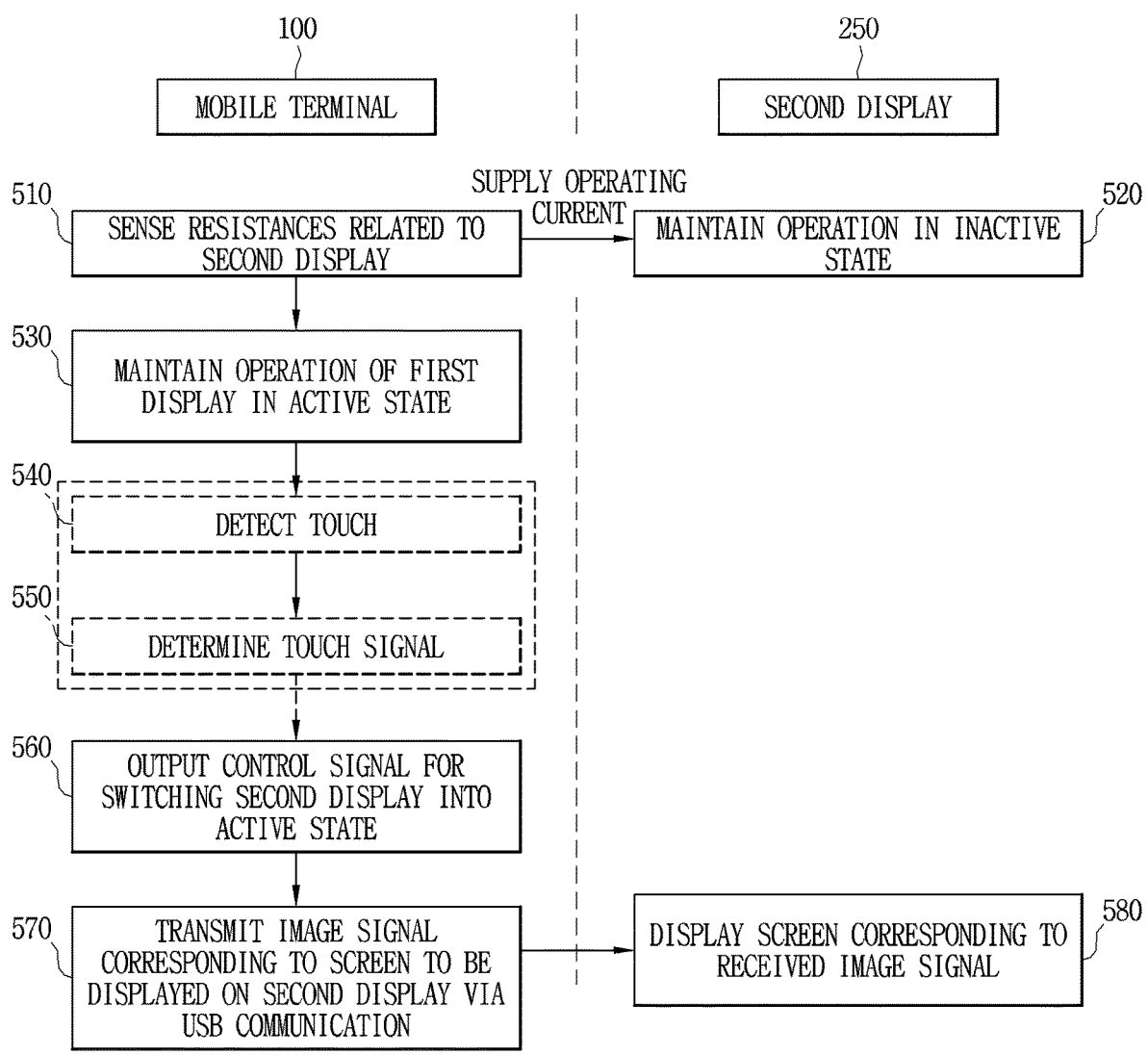
FIG. 5 is a flowchart for explaining a control method between a mobile terminal and a display provided in a case in an electronic device according to the present disclosure.

Hereinafter, a control method between the mobile terminal and the display provided in the case will be described in more detail with reference to the accompanying drawings, based on the above descriptions. FIG. 5 is a representative flowchart for explaining a control method between a mobile terminal and a display provided in a case in an electronic device according to the present disclosure.

As described above, in an electronic device 300 according to the present disclosure, when the mobile terminal 100 is coupled to the case 200, the mobile terminal 100 can sense a resistance corresponding to the second display 250 (510).

Specifically, when the connection port of the mobile terminal 100 is connected to the connector provided on one side of the case 200, the mobile terminal 100 may recognize a plurality of resistances provided with the connector to determine whether to supply an operating current to the second display 250.

When the plurality of resistances is recognized, an operating current is supplied from the mobile terminal 100 to the second display 250 through the connector, and the second display 250 can maintain an operation in the inactive state (520).

Specifically, when the plurality of resistances is recognized, the mobile terminal 100 operates in a host mode to supply the action current to the connector in a downstream manner. That is, the connection port of the mobile terminal 100 is switched to become a Downstream Facing Port (DFP) to supply an operating current to the contact pin. For example, an operating current is supplied in a form of Vconn power through the CC1 pin among the contact pins of the connector.

In this case, the second display 250 on the case 200 side operates in a device mode to receive the action current in an upstream manner. That is, the connector of the case 200 is operated as an upstream facing port (UFP).

As described above, the operating current supplied through the CC1 pin of the connector is supplied to the second display 250. In addition, an operating current is also supplied to the power unit 291 of the second display 250.

Meanwhile, as described above, the electronic device 300 may be either in an open state and a closed state, and when a transition from the closed state to the open state is detected, the first display 151 provided in the mobile terminal may maintain the operation in the active state (530). At this time, the transition from the closed state to the open state may be detected by recognizing a sensing value of the illuminance sensor provided on the front side of the mobile terminal 100, for example.

Alternatively, even when the connection port of the mobile terminal 100 is connected to the connector provided on one side of the case 200, and an input is applied to the first display 151 or the user input unit 123 in a state where the electronic device 300 is in the open state, the first display 151 may maintain the operation in the active state.

As described above, when a predetermined touch input is applied to the first display 151 while the second display 250 is maintained in the inactive state, the mobile terminal detects such a touch [540] and determines a touch signal corresponding to the detected touch [550].

When the touch signal is for switching the second display 250 into active state as a result of the determination, the controller of the mobile terminal may output a control signal for switching the second display 250 into the active state (560).

As another example, when a transition of the electronic device 300 from the closed state to the open state is detected and accordingly the first display 151 provided in the mobile terminal is operated in active state, the second display 250 may be operated in a state switched from inactive state to active state after a predetermined time (e.g., 0.5 second to 1 second) has elapsed. That is, a screen of the second display 250 may be turned on. after a predetermined time has elapsed after a screen of the first display 151 was turned on.

In this case, the above-described steps 540 and 550 are omitted, a step of detecting whether the electronic device 300 is switched from the closed state to the open state may be added before performing the step of operating the first display 151 in active state (530).

Meanwhile, as another example, although not illustrated, when a preset touch input is applied to the second display 250 while the second display 250 is operating in inactive state, a control signal to switch the second display 250 to active state may be transmitted from the mobile terminal 100.

In this case, signal processing corresponding to the touch signal sensed by the second display 250 may be performed by the first signal processor 181 and the second signal processor 281 as described above.

Specifically, the mobile terminal 100 performs wired communication in an initial state by using the first USB communication, then when the mobile terminal 100 is connected to the connector of the case 200 and recognizes the plurality of resistances Ra, Rd corresponding to the second display 250, the mobile terminal 100 controls the operation corresponding to the touch by using the second USB communication connected only with the B side contact pins (e.g., B6 and B7).

Even when the second display 250 is deactivated, the touch sensor (or touch panel 252) provided in the second display 250 is operated in active state to sense a touch applied to the second display 250.

The sensed touch may be 120 converted through the first and second signal processors 181, 281. Furthermore, the sensed touch is transmitted from the second display 250 to the mobile terminal 100 through the connector, that is, the second wired communication unit 243.

Then, the mobile terminal 100 determines the touch signal transmitted from the second display 250 as described above, and determines whether the touch signal corresponds to a preset touch input. Here, the preset touch input may refer to, for example, applying a plurality of tabs on the second display 250 in inactive state.

When the touch signal is determined to correspond to the preset touch input, the mobile terminal 100 may perform the process of step 560 described above. That is, a control signal to switch the second display 250 to active state is output by the controller of the mobile terminal 100 and may be transmitted to the second display 250.

Thereafter, the mobile terminal 100 may transmit an image signal corresponding to a screen to be outputted on the second display 250 via USB communication [570].

To this end, the first and second wired communication units 161, 243 transmit, for example, the DP format image signal through a USB SS PHY pin. Specifically, the DP format image signal is converted into MIPI format through the first and second wired communication units 161, 243 connected to each other and the data converter 282 of the second display 250 to be transmitted to the second display 250.

Next, the second display 250 may display a screen corresponding to the received signal, that is, an image signal converted to MIPI format [580]. Here, a type of the screen displayed on the second display 250 is not particularly limited. For example, it may be a home screen page different from a home screen page displayed on the first display 151 or an execution screen of a preset application.

Hereinafter, a flow process of an operation according to the present disclosure as described above will be described in detail with reference to FIGS. 6A to 6D in connection with the allocation of a memory stack.

Figure 6A:
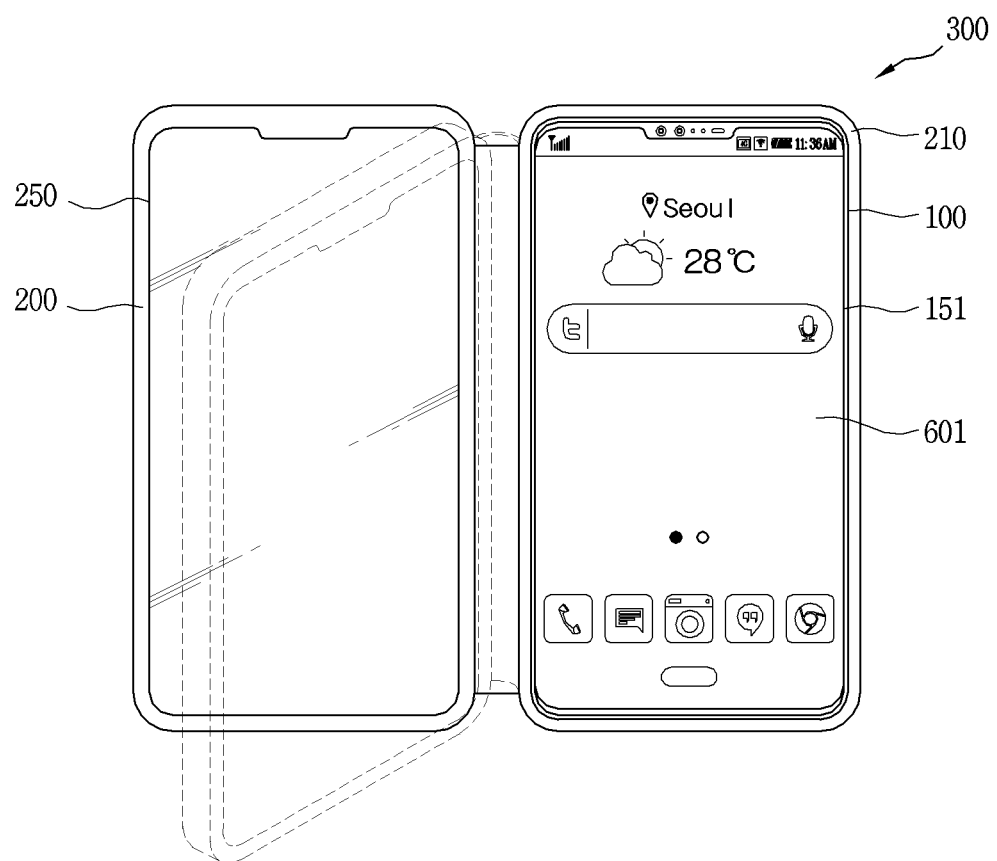
FIGS. 6A, 6B, 6C, and 6D are conceptual views for explaining control between displays and a memory control method based thereon according to the present disclosure.

Firstly, FIG. 6A illustrates a state in which the connection port of the mobile terminal is connected to the connector of the case, the first display 151 maintains the active state while the electronic device 300 is open, and the second display 250 on the case 200 side is in inactive state in the electronic device 300 according to the present disclosure.

When the connection port of the mobile terminal is connected to the connector of the case to sense a plurality of resistances corresponding to the second display 250, an operating current is supplied to the second display 250 and the circuit board of the case through the first wired communication unit 161, the second wired communication unit 243.

First screen information may be displayed on the activated first display 151. Here, a type of the first screen information is not limited. For example, the first screen information may be a first home screen page 601 as illustrated in FIG. 6A, and in other examples, the first screen information may be changed in various ways such as an execution screen of a specific application, a web page, a setting screen, etc. according to a setting or a selection of a user.

Figure 6B:
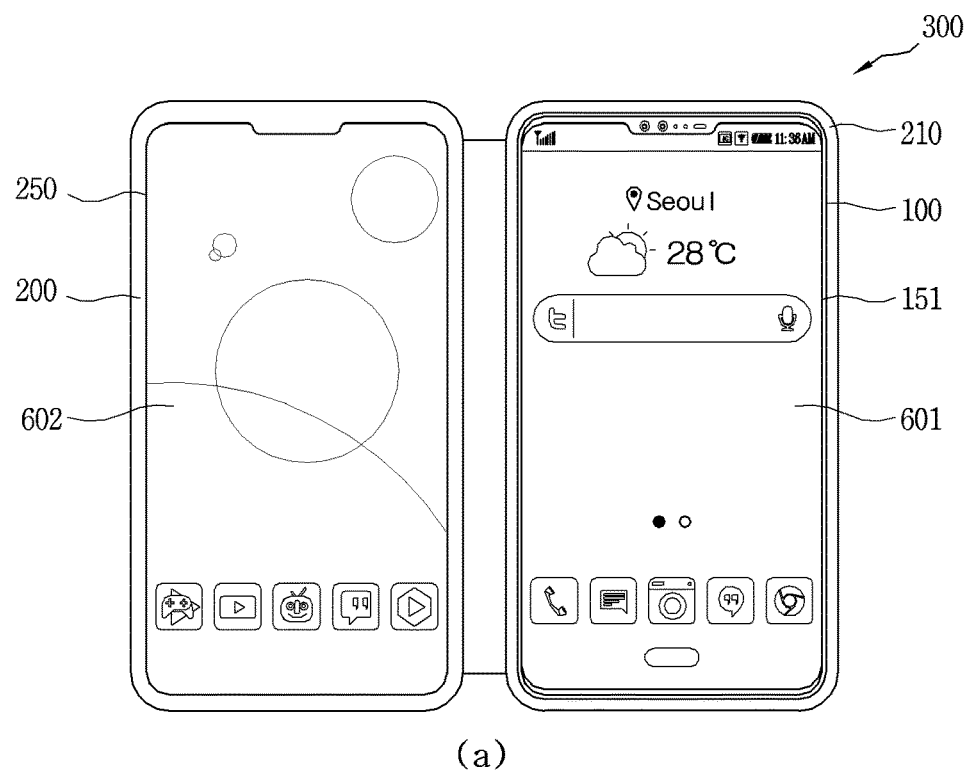
Figure 6B:
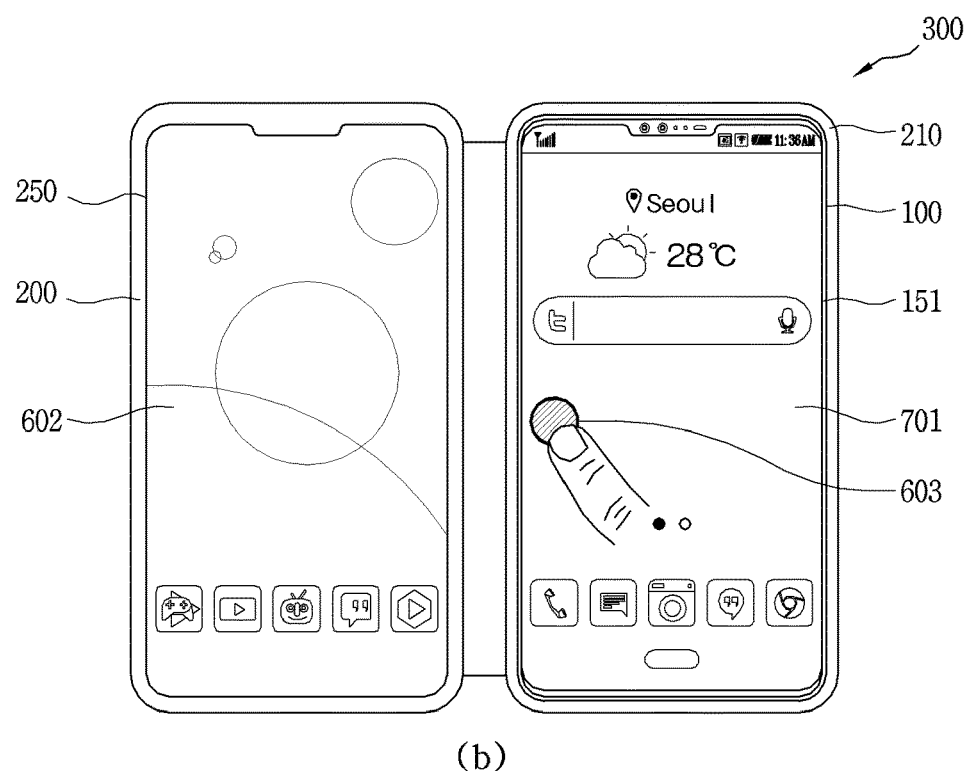
Figure 6C:
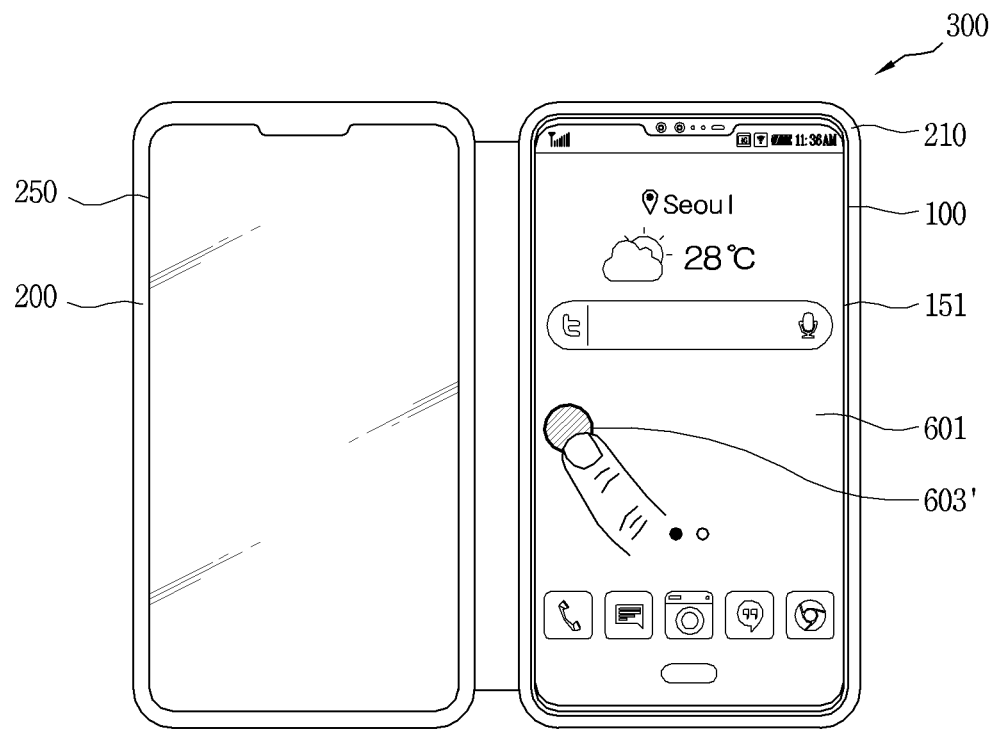
Figure 6D:
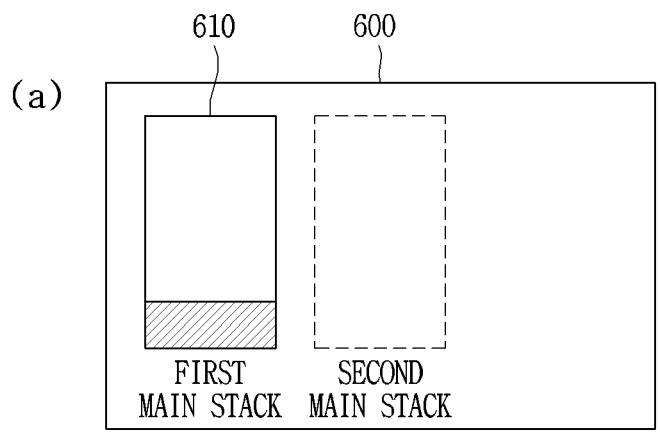
Figure 6D:
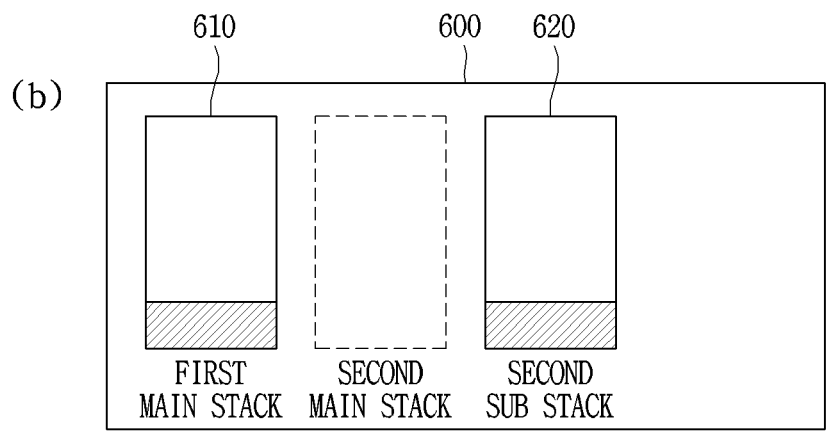
Figure 6D:
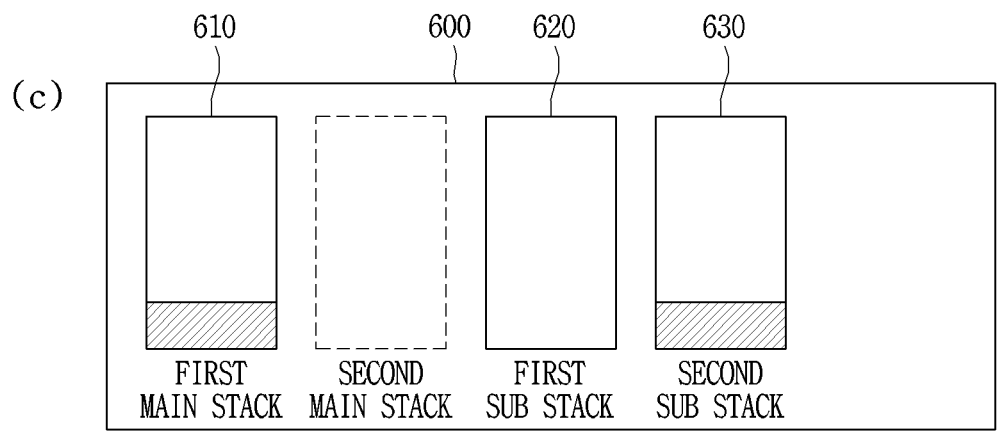

With respect to the first home screen page 601 being displayed on the first display 151 in active state, a main home stack 610 for the first display 151 may be allocated on a memory 600 of the mobile terminal 100, as illustrated in (a) of FIG. 6D. In addition, tasks related to the displaying of the first home screen page 601 may be stacked on the allocated main home stack 610.

Here, the stacking may be one of structures that stacks (PoP) data. A structure of stacking data may be of a stack type and a queue type. The stack has a data structure of first-in last-out, and the queue has a data structure of first-in first-out.

In the present disclosure, stacks for the first display 151 and the second display 250 are separately allocated and removed depending on whether they are activated.

In the open state, the second display 250 in inactive state may be switched to active state when a predetermined time has elapsed after the first display 151 is operated in active state as illustrated in (a) of FIG. 6B, or when a predetermined touch input is applied to the first display 151, for example, to a specific icon as illustrated in (b) of FIG. 6B. Alternatively, although not illustrated, when a touch input is applied to the second display 250, the second display 250 may also be switched to active state.

First, referring to (a) of FIG. 6B, when the electronic device 300 is detected to be switched from the closed state to the open state while an operating current is supplied to the second display 250 according to sensing of a resistance related to the second display 250, and the first display 151 is operated in active state, a control signal to switch the second display 250 to active state may be transmitted to the second display 250. At this time, the control signal is generated by the mobile terminal 100, and transmitted to the circuit board 244 coupled with the second display 250 via the first and second wired communication units 161, 243, and the wiring portion 242.

In addition, the image signal corresponding to the screen to be outputted on the second display 250 is also transmitted to the circuit board coupled with the second display 250 via the first and second wired communication units 161, 243, together with the control signal or sequentially after the transmission of the control signal. Here, the image signal is transmitted in DP format, converted into MIPI format that can be outputted on the second display 250 by the data converter 282, and provided to the second display 250.

Meanwhile, a condition of the open state for operating the first display 151 in active state and a condition of the open state for operating the second display 250 in active state may be different. For example, the open state in which the second display 250 is operated in active state may be limited to a state in which an angle between the first body 210 and the second body 220 is greater than that in the case of the first display 151.

For example, the first display 151 may be switched to active state when the electronic device 300 is detected to be in open state, and the second display 250 may be switched to active state when rear surfaces of the first and second bodies 210, 220 are relatively rotated to be closer to each other after the first display 151 is switched to active state.

Here, in the open state, the angle between the first display 151 and the second display 250 to switch the second display 250 to active state may be preset or changed by a user.

In addition, a setting of whether to switch the second display 250 to active state sequentially after the first display 151 is switched to active state may be on/off based on user input.

Next, referring to (b) of FIG. 6B, when a preset touch input (e.g., touch input applied to a predetermined icon 603 or multi-finger touch gesture) is applied to the first display 151 while an operating current is supplied to the second display 250, an action corresponding to the touch input, that is, a control signal to switch the second display to the active state may be transmitted to the mobile terminal 100 via USB HID communication.

At this time, since the control signal is a signal related to the touch, the control signal is transmitted to the mobile terminal 100 through the first and second signal processors, 181, 281 using USB HID communication.

Meanwhile, referring to FIG. 6C, when a preset touch input (e.g., touch input applied to the predetermined icon 603 or multi-finger touch gesture) is again applied to the first display 151 while the second display 250 is operated in active state, the second display 250 is switched to inactive state.

To this end, a control signal corresponding to the touch signal of the preset touch input and to switch the second display 250 into inactive state is transmitted from the mobile terminal to the display 250 using USB communication. Accordingly, the second display 250 is switched back to the inactive state, and the transmission of the image signal from the mobile terminal is stopped.

Meanwhile, as another example, when a preset touch input (e.g., a double tap) is applied to the second display while an operating current is supplied to the second display 250, a touch signal corresponding to the preset touch input is transmitted to the mobile terminal 100 through the first and second signal processors 181, 281 using USB HID communication.

Then, the controller 180 of the mobile terminal 100 transmits a control signal to activate the second display 250 to the circuit board coupled with the second screen 251 and the second display 250 via the connector connected with the connection port of the mobile terminal, based on the transmitted touch signal. At this time, since the control signal is a signal related to the touch, the control signal is transmitted to the mobile terminal 100 through the first and second signal processors 181, 281 using USB HID communication.

Here, the signal related to the touch is initially transmitted and received through USB 2.0 communication (hereinafter, referred to as 'first USB communication'), then transmitted and received through the switched USB HID communication (hereinafter, referred to as 'second USB communication') when the mobile terminal 100 is operated in the host mode (i.e., when resistances Ra, Rd are sensed).

In addition, the control signal is transmitted to the second display 250 through the first wired communication unit 161, the second wired communication unit 243, and the wiring unit 240 in AUX format. The control signal in the AUX format is transmitted to the second display 250 via the second data converter 282.

As described above, when the second display 250 is switched to active state, second screen information, for example, a second home screen page may be displayed on the second display 250.

To this end, the image signal corresponding to the screen to be outputted on the second display 250 is transmitted to the circuit board of the case coupled with the second display 250 via the first and second wired communication units 161, 243, and the wiring portion 242. Here, the image signal is transmitted in DP format, converted into MIPI format that can be outputted on the second display 250 by the data converter 282, and provided to the second display 250.

Meanwhile, a control signal to switch the second display 250 to active state and the image signal corresponding to the screen to be outputted on the second display 250 are transmitted through different contact pins in the first and second wired communication units 161, 243.

With respect to the first home screen page 601 being displayed on the active first display 151, referring to (b) of FIG. 6D, a sub home stack 620 for the second display 250 in addition to the main home stack 610 for the first display 151 is allocated on the memory 600.

At this time, tasks related to the DP format image signal transmitted to the circuit board 244 coupled with the second display 250 via the first wired communication unit 161, the second wired communication unit 243, and the wiring portion 242 is stacked on the sub home stack 620.

The main home stack 610 and the sub home stack 620 are independently controlled, and when a task corresponding to a specific application is executed on the second display 250, a sub-app stack 630 is additionally allocated to the memory and the task corresponding to the specific application is stacked as illustrated in (c) of FIG. 6D.

The controller 180 of the mobile terminal may transmit the DP format image signal corresponding to the task stacked on the sub-app stack 630 to the second display 250 via the first and second wired communication units 161, 243 and the wiring portion 242.

Here, the image signal in the DP format is converted into MIPI format by the second data converter 282 so that it can be outputted on the second display 250, and then transmitted to the second display 250. Accordingly, screen information corresponding to the task stacked on the sub-app stack 630 is displayed on the second display 250.

As described above, in the electronic device 300 according to the present disclosure, a control signal transmitted to the circuit board connected to the second display 250 and an image signal corresponding to screen information to be displayed on the second display 250 are transmitted through different contact pins.

Meanwhile, as illustrated in FIG. 6C, when the second display 250 is deactivated, the sub-stacks (e.g., sub home stack and sub-app stack) allocated on the memory are deleted from the memory.

Meanwhile, although not illustrated, when the connection port of the mobile terminal and the connector of the case are disconnected so that the wired communication path of the first and the second wired communication units 161, 243 is released while the second display 250 is activated, supply of operation current is cut off, and the second display 250 is switched to inactive state.

Here, when the connection port of the mobile terminal and the connector of the case are connected again, the second display 250 is switched back to active state, and the screen information displayed on the second display 250 before the connection is cut off may be output again.

Meanwhile, in the above description, in a case where a case is provided with a second display and a mobile terminal is mounted on the case, a configuration of allowing screen information to be output through the second display and a first display of the mobile terminal have been described in detail.

In the following description, when a mobile terminal is mounted on a case having the second display, an operation of performing a function according to a multi-touch event based on touch inputs respectively applied to the first display of the mobile terminal and the second display will be described.

In the following description, a display to which a touch input including a touch event is applied will be referred to as a touch screen.

Furthermore, in the present disclosure, the touch event may include all of various types of touch inputs. For example, the touch event may include all of a short touch, a double touch, a long touch, a touch and drag, a flicking touch, a swipe touch, a pinch-in/out touch, a multi-finger touch, a hover touch, and the like.

In addition, the touch event may include a key event for generating a specific key value in addition to a touch event, a motion event for generating a touch signal value with respect to a touch point.

Figure 7:
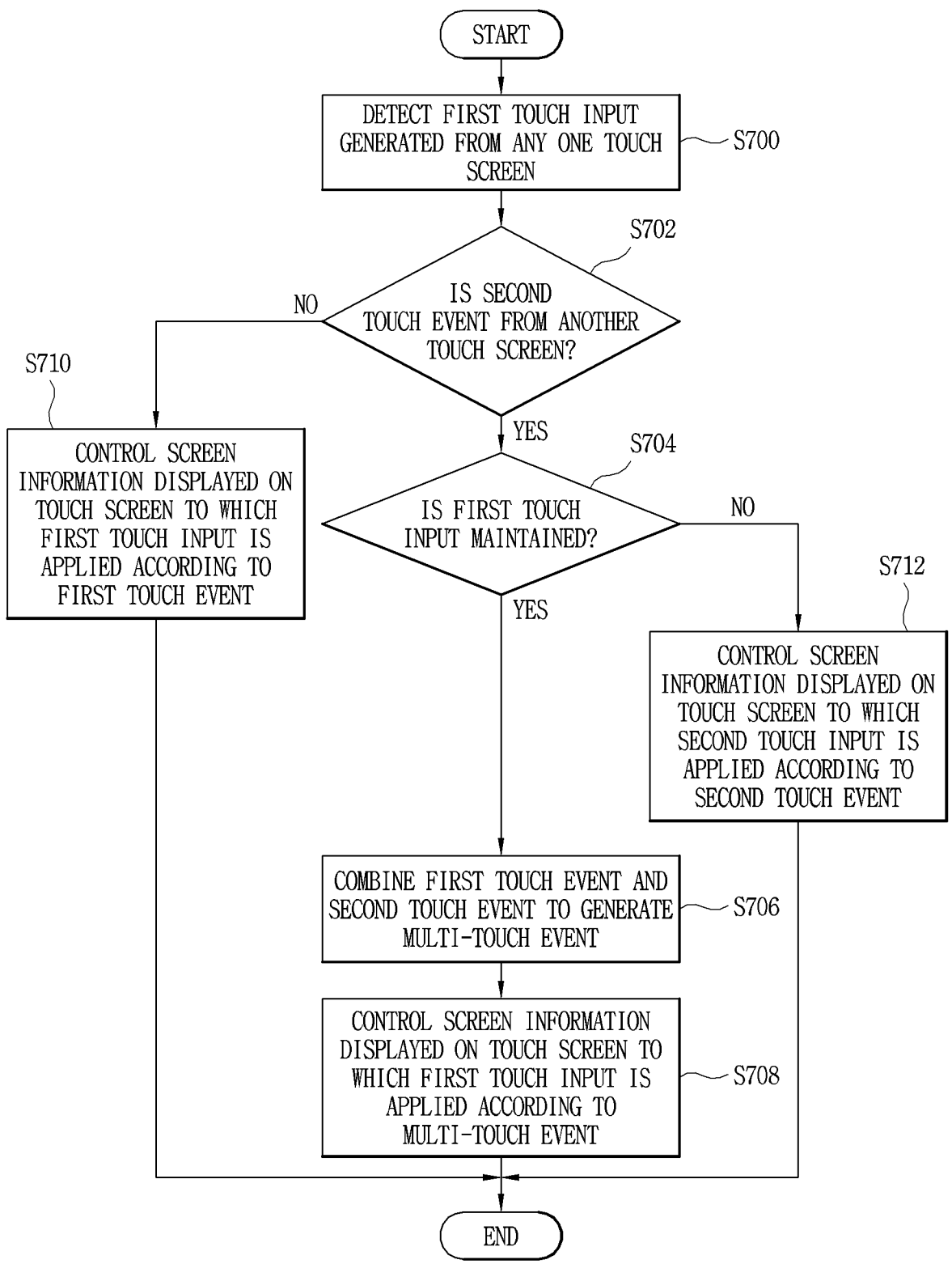
FIG. 7 is a flowchart illustrating an operation process in which a multi-touch function is performed according to a first touch input and a second touch input in a mobile terminal mounted on a case including a second touch screen according to an embodiment of the present disclosure.

First, FIG. 7 is a flowchart illustrating an operation process in which a multi-touch function is performed according to a first touch input and a second touch input in a mobile terminal 100 mounted on a case including a second touch screen according to an embodiment of the present disclosure.

Referring to FIG. 7, when the mobile terminal 100 according to an embodiment of the present disclosure is mounted on the case 200 including the second touch screen 250, the second touch screen 250 is may be activated under the control of the controller 180. Furthermore, screen information to be output to the activated second touch screen 250 may be transmitted to the second touch screen 250.

In this case, the controller 180 may cause the first touch screen 151 and the second touch screen 250 to interwork each other so as to output screen information related to one application. As an example, the controller 180 may control the first touch screen 151 and the second touch screen 250 to cause a part of the execution screen of the application to be output to the first touch screen 151, and the remaining part thereof to be output through the second touch screen 250.

As such, when the execution screen of either one application is displayed through two touch screens or the execution screens of the same application or applications to each other are displayed on each touch screen, it may be said that the touch screens are interworked with each other.

When the first touch screen 151 and the second touch screen 250 are interworked with each other, the controller 180 may detect a first applied touch input, that is, a first touch input from either one of the first and second touch screens. In addition, a first touch event defined by the first touch input may be detected (S700). As an example, when a touch input is generated by a first touch input and subsequently a drag input is applied, the controller 180 may detect that a touch event defined by touch-and-drag has generated by the first touch input.

Meanwhile, when the first touch event is detected in step S700, the controller 180 may detect whether a touch input (second touch input) applied to another touch screen is applied (S702). Here, the other touch screen may be a touch screen different from the touch screen on which the first touch event is detected. As an example, when the first touch event is detected on the first touch screen 151, the controller 180 may detect whether a second touch event defined by the second touch input is generated from the second touch screen 250 in step S702.

In this case, the controller 180 may determine whether the second touch event has been generated for a preset time period, and determine that the second touch event has not been generated when the second touch event has not been generated within the preset time period.

Furthermore, when the second touch event is not generated as a result of the detection in step S702, the controller 180 may control screen information displayed on the touch screen to which the first touch input is applied according to the first touch event (S710). That is, when a touch input is not applied to the second touch screen 250 while the first touch input is applied to the first touch screen 151, the controller 180 may determine the first touch event defined by the first touch input as an input to the first touch screen 151. Accordingly, screen information displayed on the first touch screen 151 may be controlled according to the first touch event.

On the contrary, when the second touch event is generated as a result of the detection in step S702, the controller 180 may detect whether the first touch input is being maintained at the time the second touch event is generated (S704). That is, the controller 180 may detect whether the second touch event according to the second touch input has been generated while the first touch input is being applied to either one touch screen.

As a result of the detection in step S704, when the second touch event is generated while the first touch input is not maintained, the controller 180 may determine the second touch event as an input to the touch screen to which the second touch input is applied. Here, when the second touch input is applied to the second touch screen 250, the controller 180 may control screen information displayed on the second touch screen 250 according to the second touch event defined by the second touch input (S712).

However, as a result of the detection in step S704, when the second touch event is generated while the first touch input is maintained, that is, when both touch inputs defining the first touch event and the second touch event are simultaneously applied to the first touch screen 151 and the second touch screen 250, the controller 180 may combine the first touch event and the second touch event to generate a multi-touch event (S706).

In step S706, the controller 180 may combine the first touch event and the second touch event into a multi-touch input applied to the touch screen on which the first touch event is detected. To this end, the controller 180 may map the second touch event to the touch screen on which the first touch event is detected. Accordingly, the first touch event and the mapped second touch event may be combined as a multi-touch input applied to the touch screen on which the first touch event is detected. Then, the controller 180 may determine that a multi-touch event according to the multi-touch input has been generated.

An operation process of combining the first touch event and the second touch event to generate a multi-touch event will be described in more detail with reference to FIG. 8.

Meanwhile, when a multi-touch event is generated in step S706, the controller 180 may control screen information displayed on either one touch screen according to the generated multi-touch event (S708). In this case, as described above, since the first touch event and the second touch event are combined as a multi-touch input to the touch screen on which the first touch event is generated, the controller 180 may control screen information displayed on the touch screen on which the first touch event is generated according to the multi-touch event.

As an example, when the multi-touch event, the first touch input defining the first touch event and the second touch input defining the mapped second touch event, defines a pinch-in or pinch-out input that is dragged in a direction toward or away from each other, the controller 180 may execute a function of reducing or enlarging screen information according to the defined multi-touch event, that is, a pinch-in or pinch-out.

In this case, the controller 180 may perform a function according to the multi-touch event with respect to one point on the touch screen on which the first touch event is generated. Here, one point on the touch screen to which the first touch input is applied may be a point to which the first touch input defining the first touch event is first applied. That is, when the multi-touch event defines a pinch-in or pinch-out, screen information displayed on the first touch screen 151 and the second touch screen 250 may be reduced or enlarged with respect to one point on the touch screen on which the first touch input is first detected.

Figure 8:
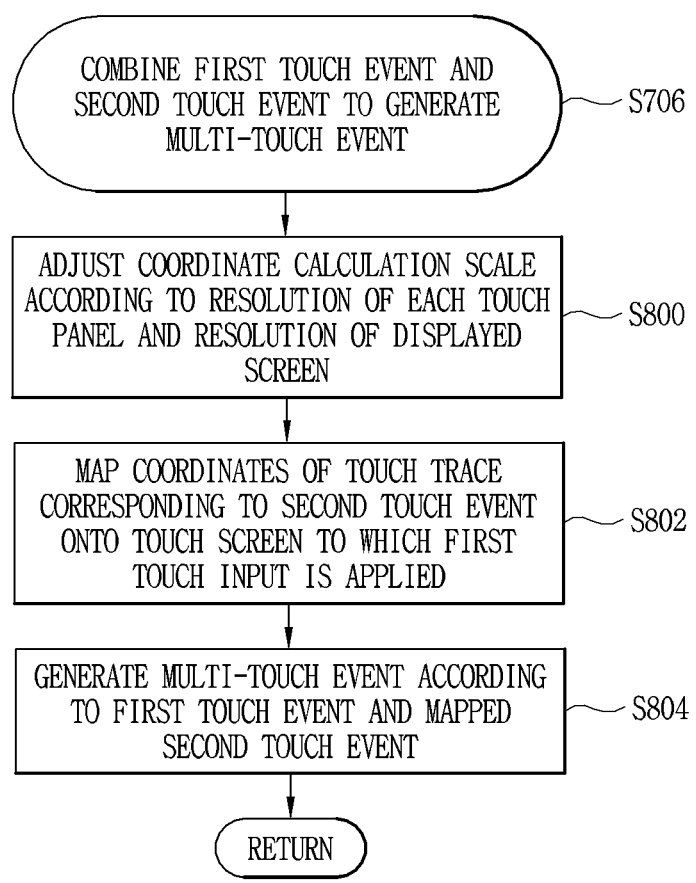
FIG. 8 is a flowchart illustrating an operation process of combining a first touch event and a second touch event to generate a multi-touch event during the operation process of FIG. 7.

FIG. 8 is a flowchart illustrating an operation process of combining a first touch event and a second touch event to generate a multi-touch event during the operation process of FIG. 7.

Referring to FIG. 8, when a second touch input is applied while a first touch input is maintained, the controller 180 may set a coordinate calculation scale based on a touch panel resolution and a screen resolution to which the first touch input is applied, and based on a touch panel resolution and a screen resolution to which the second touch input is applied (S800).

Here, the screen resolution or the touch panel resolution may denote a size of screen information displayed on the touch screen or a size of the touch screen. That is, the controller 180 may determine a scale of coordinates corresponding to a second touch event according to the size of the touch screen to which the second touch input is applied and the size of screen information displayed through the touch screen in step S800.

As an example, when a first touch input is applied to the first touch screen 151 and a second touch input is applied to the second touch screen 250, on the assumption that the sizes of the first touch screen 151 and the second touch screen 250 are the same, in a case where the screen information displayed on the second touch screen 250 is enlarged by 2 times according to a zoom-out performed on the second touch screen 250, the controller 180 may reduce a length or size of the second touch event defined by the second touch input by half.

Conversely, on the assumption that the size of the second touch screen 250 is smaller than that of the first touch screen 151, when the same screen information is displayed through the first touch screen 151 and the second touch screen 250, screen information displayed on the second touch screen 250 may be displayed smaller due to a difference in the sizes of the display regions of the touch screens. Accordingly, the controller 180 may enlarge the length or size of the second touch event defined by the second touch input according to the size of the screen information displayed smaller on the second touch screen 250.

That is, the controller 180 may adjust a size or length of a touch trace of the second touch event defined by the second touch input according to differences in sizes of the display regions and sizes of the displayed screen information of individual touch screens to a display region of a touch screen to which the first touch input is applied and a size according to screen information in step S800.

Meanwhile, when the size or length of the touch trace of the second touch event is adjusted, the controller 180 may map the coordinates of the touch trace corresponding to the second touch event onto the touch screen to which the first touch input is applied (S802).

Here, the controller 180 may map a starting point of the coordinates corresponding to the touch trace to the vicinity of a point to which the first touch input is applied. That is, when a second touch input is applied while a first touch input is being applied, the controller 180 may map coordinates corresponding to the second touch input to the vicinity of a point to which the first touch input is applied on the touch screen to which the first touch input is applied. In addition, the coordinates of the touch trace of the second touch input defined by the second touch input may be sequentially mapped using the mapped coordinates as the starting point.

Here, the vicinity of the point to which the first touch input is applied may denote a point within a preset distance from the point to which the first touch input is applied. More preferably, the controller 180 may determine the coordinates of a starting point of the second touch event corresponding to the second touch input according to relative positions of the touch screen to which the first touch input is applied and the touch screen to which the second touch input is applied.

As an example, as shown in FIG. 1A, in a case where the second touch screen 250 is located at a left side of the first touch screen 151, when a first touch input is applied to the first touch screen 151, and a second touch input is applied to the second touch screen 250, the controller 180 may map the coordinates of the starting point of the second touch event corresponding to the second touch input to a left side of the point to which the first touch input is applied on the first touch screen 151 according to relative positions of the second touch screen 250 and the first touch screen 151.

On the contrary, when a first touch input is applied to the second touch screen 250 and a second touch input is applied to the first touch screen 151, the controller 180 may map the coordinates of the starting point of the second touch event corresponding to the second touch input to a right side of the point to which the first touch input is applied on the second touch screen 250 according to the relative positions of the second touch screen 250 and the first touch screen 151.

Meanwhile, when the coordinates of the touch trace corresponding to the second touch event are mapped to the touch screen to which the first touch input is applied in step S802, the controller 180 may define a multi-touch event according to the first touch event defined from the first touch input and the mapped second touch event (S804).

As an example, when the first touch event and the mapped second touch event are touch inputs in which the first touch input and the mapped second touch input are dragged in a direction away from each other, the controller 180 may combine the first touch input and the mapped second touch input into a multi-touch event corresponding to a pinch-out. Conversely, when the first touch event and the mapped second touch event are touch inputs in which the first touch input and the mapped second touch input are dragged in a direction toward each other, the controller 180 may combine the first touch input and the mapped second touch event into a multi-touch event corresponding to a pinch-in.

Furthermore, when the multi-touch event is combined, the controller 180 proceeds to step S708 in FIG. 7, and performs a function according to the combined multi-touch event on image information displayed on the touch screen to which the first touch input is applied. As an example, according to the multi-touch event, the controller 180 may perform a function of enlarging or reducing image information displayed on a touch screen to which the first touch input is applied.

Figure 9A:
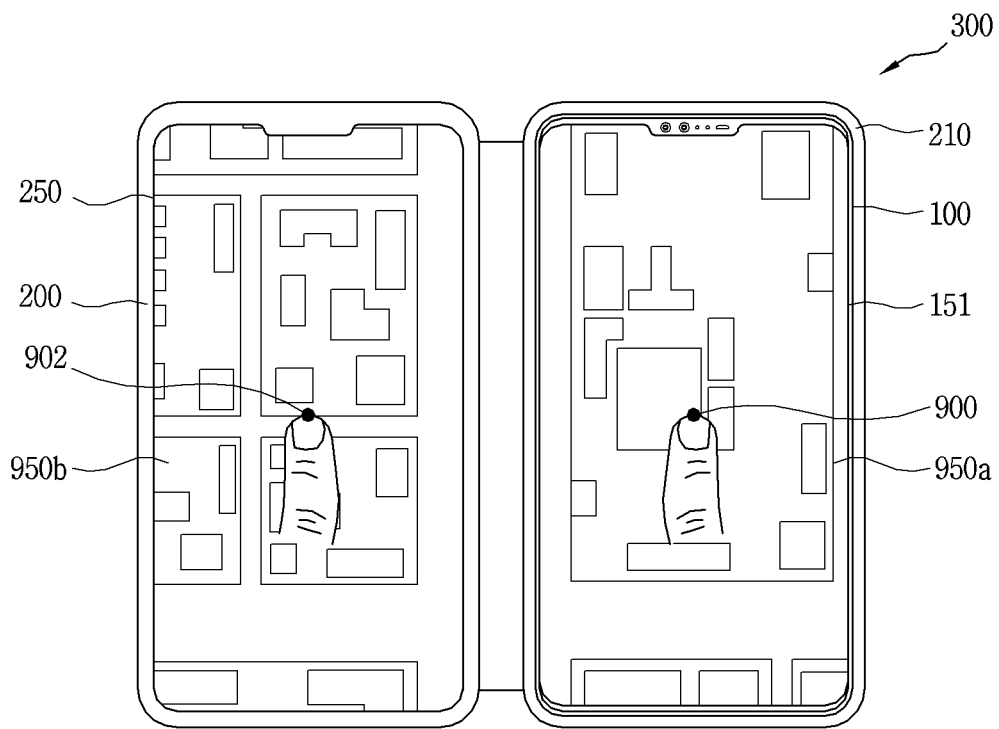
FIGS. 9A through 9C are exemplary views sequentially illustrating an example in which a multi-touch function is performed according to a first touch input and a second touch input in a mobile terminal mounted on a case including a second touch screen according to an embodiment of the present disclosure.
Figure 9A:
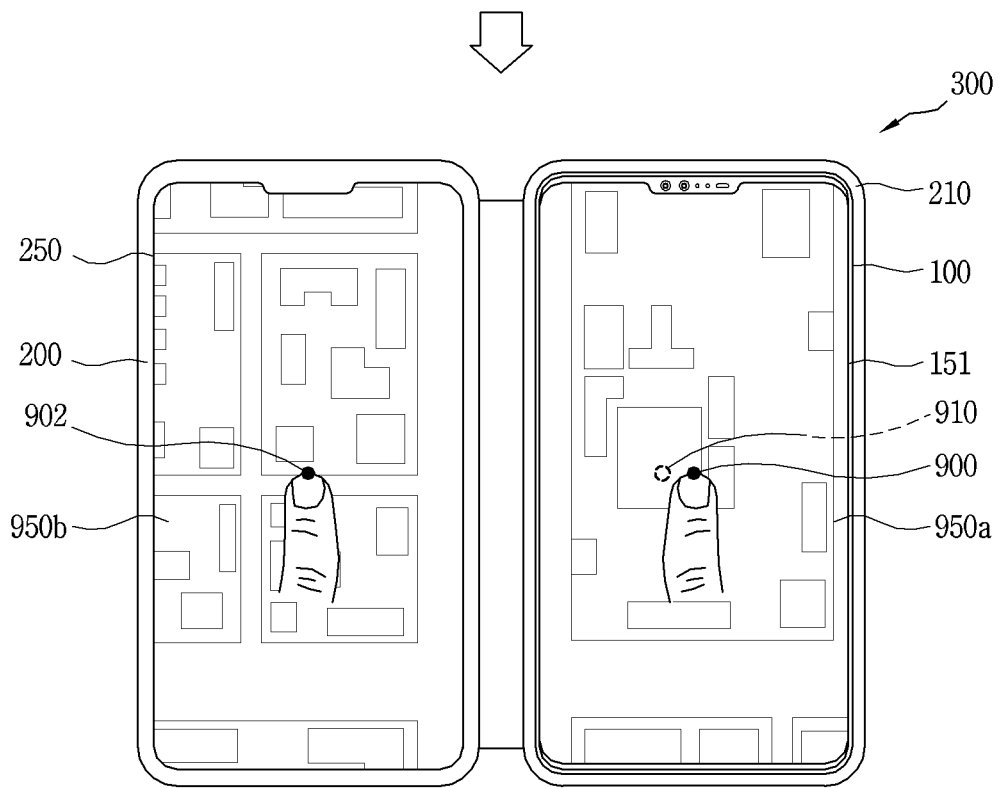
Figure 9B:
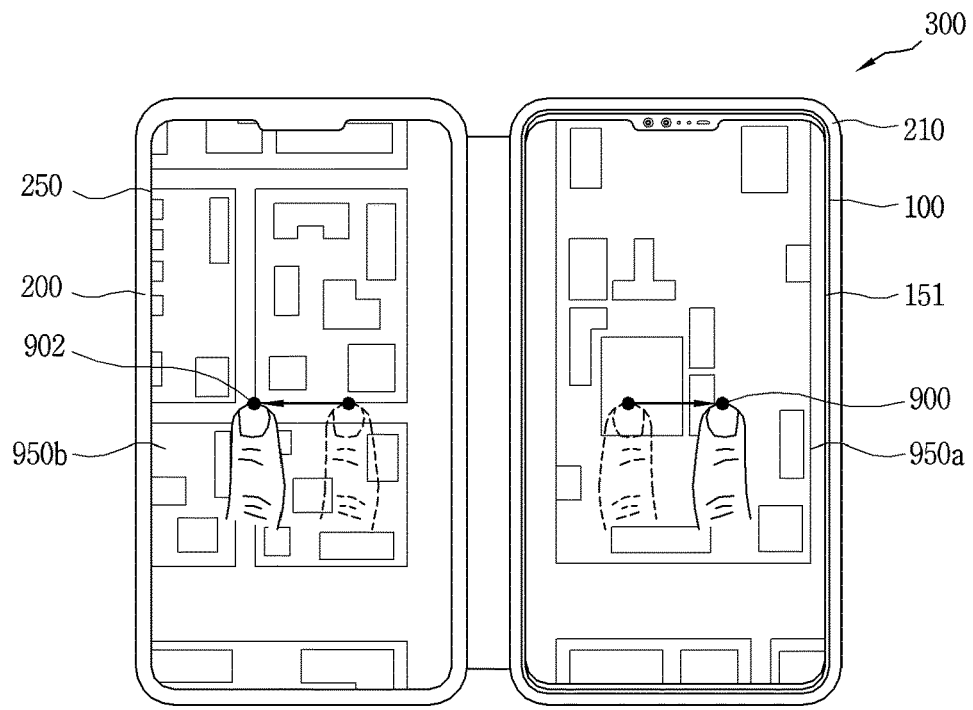
Figure 9B:
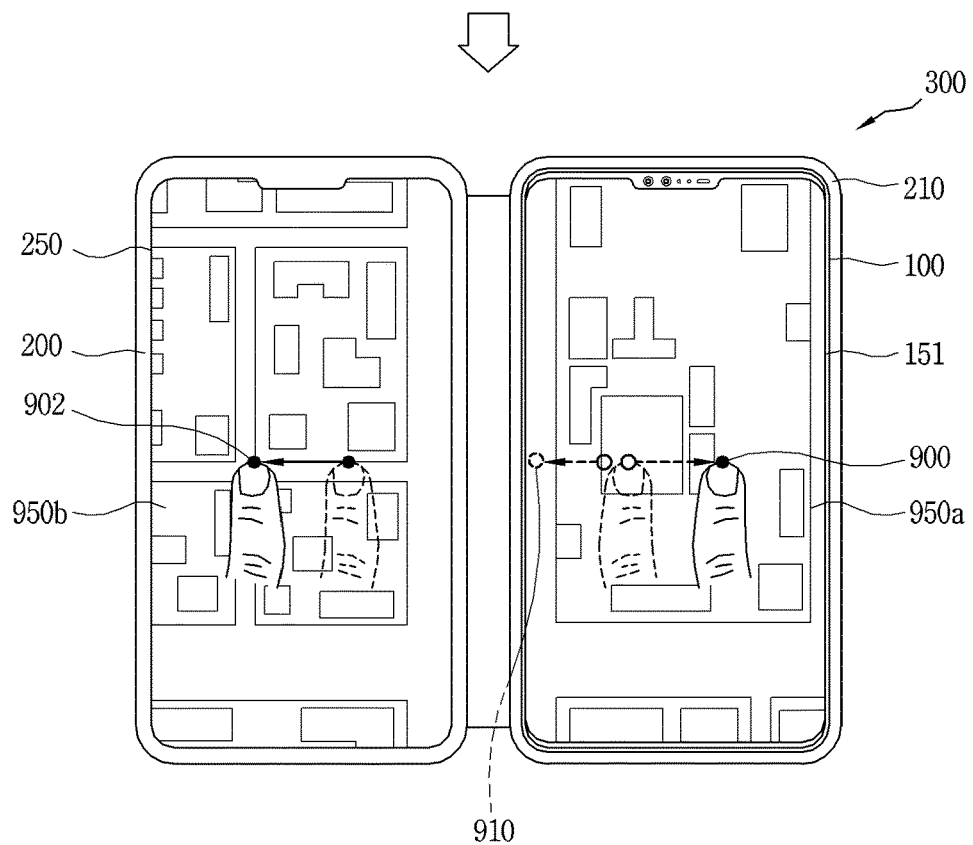
Figure 9C:
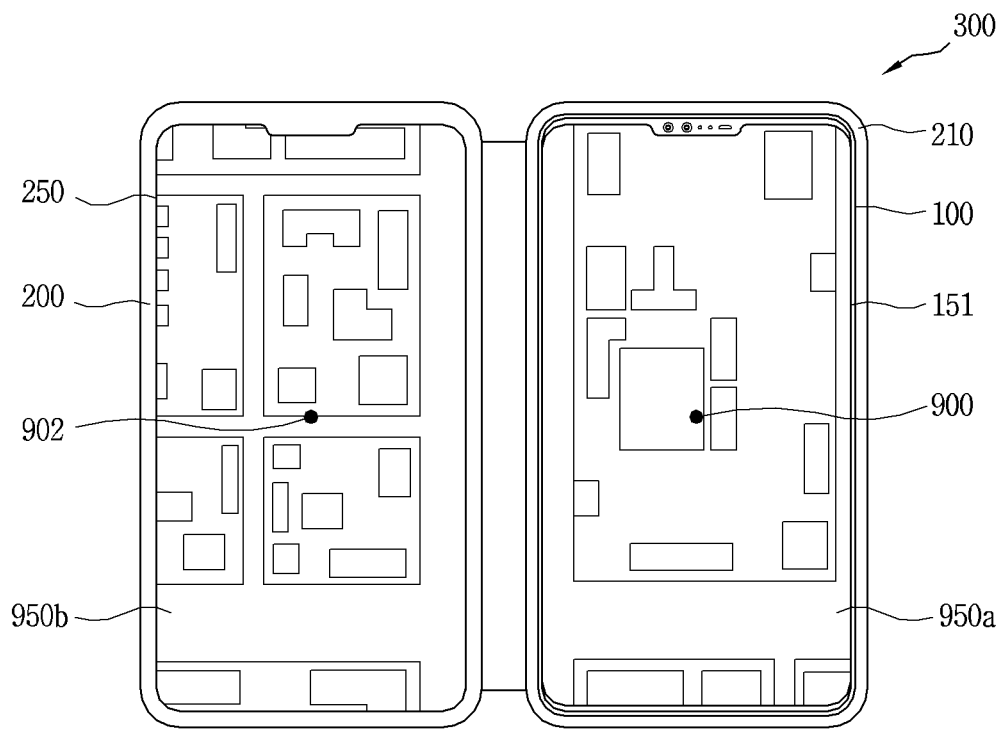
Figure 9C:
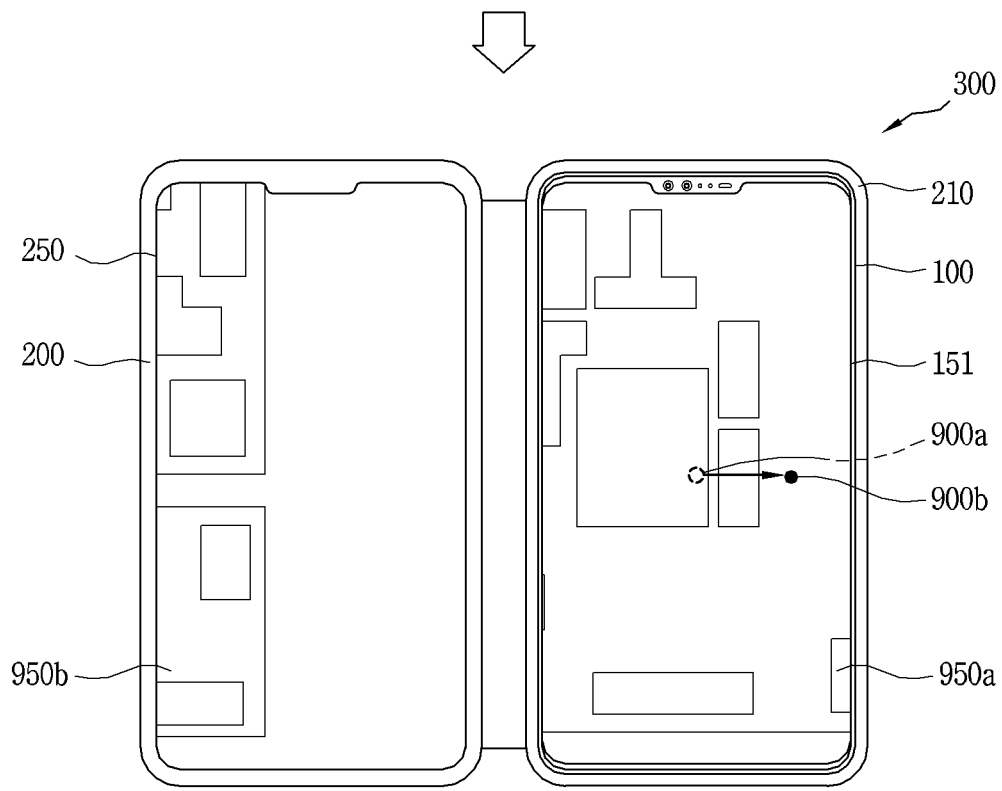

On the other hand, FIGS. 9A through 9C are exemplary views sequentially illustrating an example in which a multi-touch function is performed according to a first touch input and a second touch input in the mobile terminal 100 mounted on the case 200 including the second screen 250 according to such an embodiment of the present disclosure.

First, referring to FIG. 9A, a drawing illustrated in the top of FIG. 9A shows an example in which a first touch input and a second touch input are applied while the mobile terminal 100 having the first touch screen 151 is mounted on the case 200 including the second touch screen 250 according to an embodiment of the present disclosure.

In this case, as shown in the top drawing of FIG. 9A, the first touch screen 151 and the second touch screen 250 may be interworked with each other under the control of the controller 180. When the first touch screen 151 and the second touch screen 250 are interworked with each other as described above, the first touch screen 151 and the second touch screen 250 may display an execution screen of a specific application. In this case, a part 950*a* of the execution screen may be displayed on the first touch screen 151, and the remaining part 950*b* of the execution screen may be displayed on the second touch screen 250.

Meanwhile, in a state in which the first touch screen 151 and the second touch screen 250 are interworked with each other as described above, the controller 180 may detect a first touch input 900 applied to the first touch screen 151. In addition, while the first touch input is applied, a second touch input 902 applied to the second touch screen 250 may be detected. The top drawing of FIG. 9A illustrates an example of a state in which the first touch input 900 and the second touch input 902 are applied to the first touch screen 151 and the second touch screen 250, respectively.

Meanwhile, the bottom drawing of FIG. 9A shows an example in which coordinates corresponding to the second touch input 902 are mapped as the second touch input 902 is applied. As shown in the bottom drawing of FIG. 9A, when the second touch input 902 applied to the second touch screen 250 is applied while the first touch input is applied, the controller 180 may map the coordinates of a mapping starting point 910 corresponding to the second touch input 902 to one point on the first touch screen 151 to which the first touch input 900 is applied.

In this case, the coordinates of the mapping starting point 910 may be mapped the vicinity of a point to which the first touch input 900 is applied. In addition, according to the relative positions of the touch screen (first touch screen 151) to which the first touch input 900 is applied and the touch screen (second touch screen 250) to which the second touch input 902 is applied, the mapping starting point may be mapped to a left side of one point on the first touch screen 151 to which the first touch input 900 is applied.

Meanwhile, in this state, as shown in the top drawing of FIG. 9B, when the first touch input 900 is dragged to the right and the second touch input 902 is dragged to the left, the controller 180 may define a first touch event and a second touch event, respectively.

Then, the controller 180 may map the coordinates of the dragged second touch input 902 onto the first touch screen 151 to which the first touch input 900 is applied. Accordingly, as shown in the bottom drawing of FIG. 9B, the coordinates of the mapping starting point 910 may be dragged according to a direction and a length in which the second touch input 902 has been dragged.

Here, a length in which the coordinates of the mapping starting point 910 is dragged may be longer or shorter than that in which the second touch input 902 is dragged according to sizes of the display regions and sizes of the displayed screen information of the second touch screen 250 to which the second touch input 902 is applied and the first touch screen 151 to which the first touch input 900 is applied.

Meanwhile, when the coordinates of the mapping starting point 910 are dragged, the controller 180 may determine the dragged the mapping starting point 910 as a second touch event mapped to the first touch screen 151. In addition, a first touch event defined by dragging the first touch input 900 and the mapped second touch event may be combined to generate a multi-touch event for the first touch screen 151. In this case, as shown in the bottom of FIG. 9B, when the first touch event and the mapped second touch event are generated by the first touch input defining the first touch event and the mapped second touch input that are moving away from each other, the controller 180 may generate a multi-touch event corresponding to a pinch-out input based on the first touch event and the mapped second touch event.

When the multi-touch event is generated as described above, the controller 180 may control screen information displayed on the touch screen to which the first touch input is applied based on the generated multi-touch event. As an example, as shown in the bottom drawing of FIG. 9B, when a first touch event and a second touch event mapped to the first touch screen 151 define a pinch-out input, the controller 180 may enlarge screen information displayed on the first touch screen 151 according to the pinch-out input.

Accordingly, as shown in the top drawing of FIG. 9C, the screen information displayed on the first touch screen 151 and the second touch screen 250, respectively, may be enlarged and displayed according to the multi-touch input defined from the first touch input 900 and the second touch input 902 respectively applied to the first touch screen 151 and the second touch screen 250 as shown in the bottom drawing of FIG. 9C. In this case, since the first touch input 900 is applied to the first touch screen 151, the controller 180 may enlarge and display screen information displayed on the first touch screen 151 and the second touch screen 250 with respect to a point 900a to which the first touch input 900 is first applied.

Meanwhile, as described above, the present disclosure may be applied to a case where screen information is displayed on two touch screens interworking with each other, which are mounted on the case to the display screen information under the control of the mobile terminal controller 180, as well as between two touch screens spaced apart from each other.

Figure 10A:
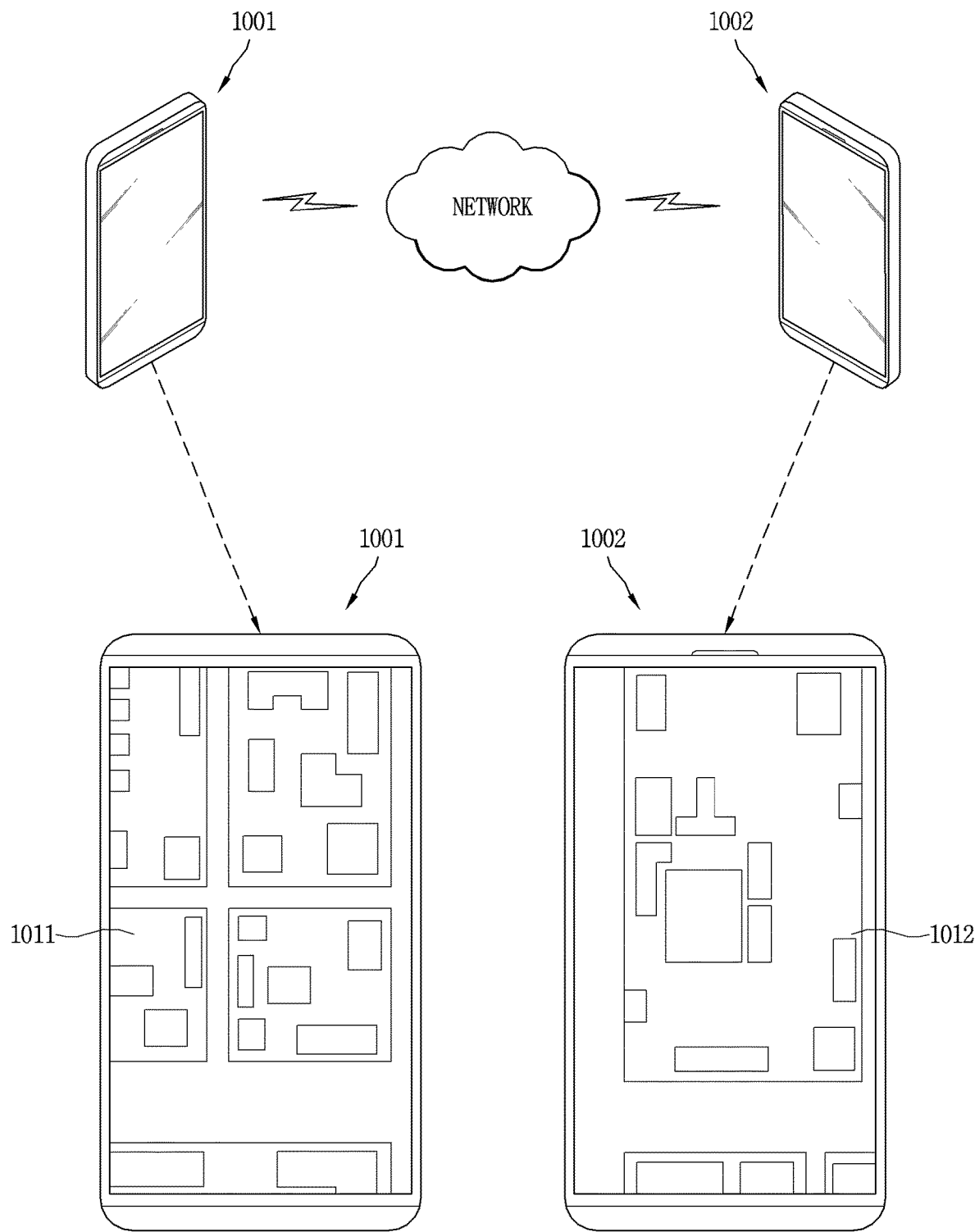
FIGS. 10A and 10B are exemplary views illustrating an example in which a multi-touch function defined according to a first touch input applied to a mobile terminal and a second touch input applied to another touch screen device is performed according to an embodiment of the present disclosure.
Figure 10B:
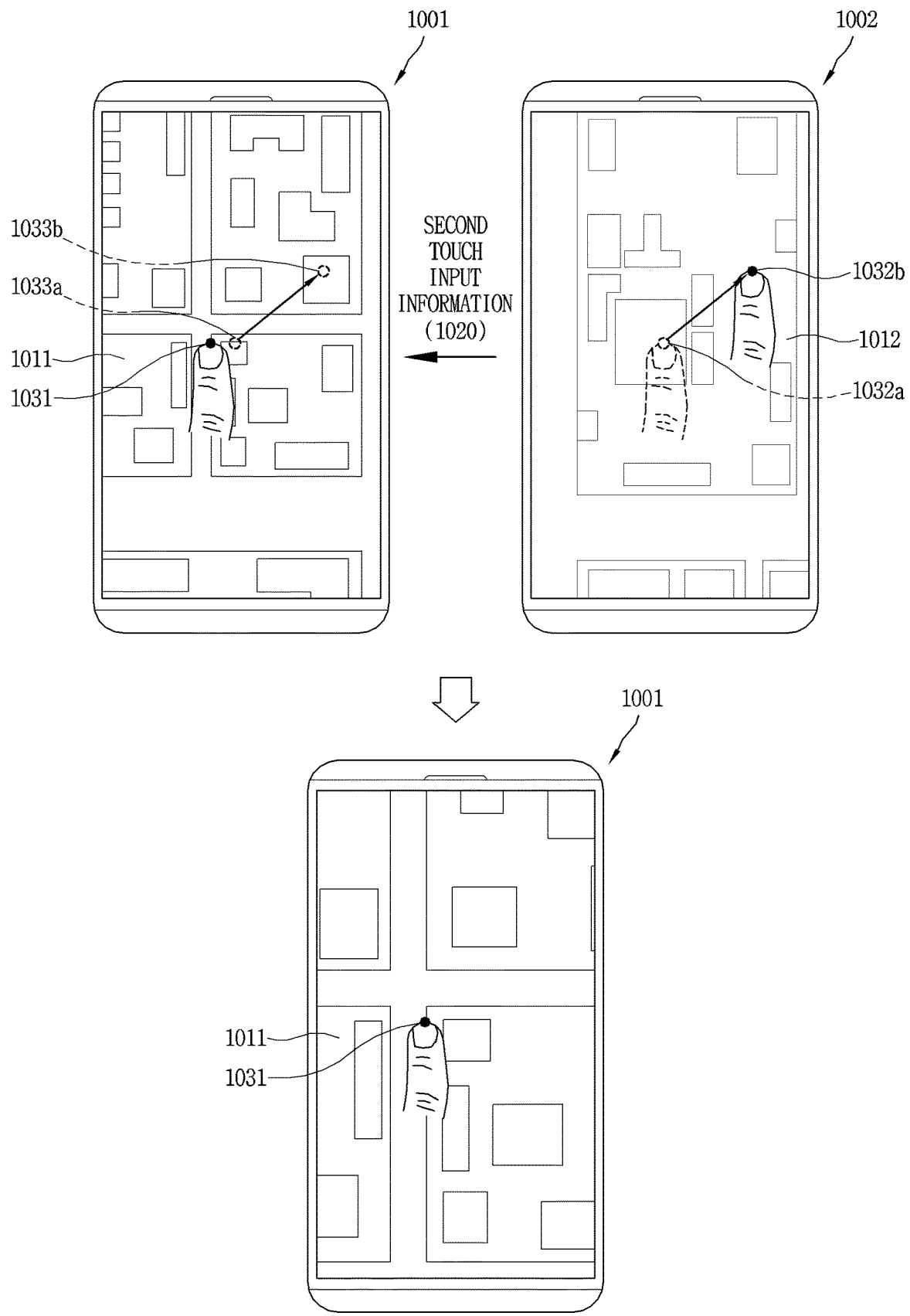

FIGS. 10A and 10B are exemplary views illustrating an example in which a multi-touch function defined according to a first touch input applied to a mobile terminal and a second touch input applied to another touch screen device spaced apart therefrom is performed in this case.

As an example, the two touch screens spaced apart from each other may be provided in different mobile terminals (first and second mobile terminals 1001, 1002) as shown in FIG. 10A.

In this case, the mobile terminals 1001, 1002 may be mobile terminals executing applications interworking with each other or the same applications as each other. When executing applications interworking with each other or the same applications as each other, execution screens with the same applications or execution screens interworking with each other may be displayed on the touch screens 1011, 1012 of the individual mobile terminals 1001, 1002 as shown in FIG. 10A.

On the other hand, as shown in FIG. 10A, when mobile terminals 1001, 1002 executing applications interworking with each other or the same applications as each other are connected to each other through a network, the mobile terminals 1001, 1002 may generate a multi-touch event from touch inputs applied to individual touch screens. In addition, screen information displayed on a touch screen provided in either one mobile terminal may be controlled according to the generated multi-touch event.

Referring to FIG. 10B, the top view of FIG. 10B illustrates an example in which a second touch input 1032 is applied to the second mobile terminal 1002 while a first touch input 1031 is applied to the first mobile terminal 1001. As such, when the first touch input 1031 between the first touch input 1031 and the second touch input 1032 is first applied, the controller of the first mobile terminal 1001 may receive second touch input information 1020 including coordinate information for the second touch input 1032 from the second mobile terminal 1002, and map the coordinates corresponding to the received second touch input information to one point 1033a on the touch screen 1011 of the first mobile terminal 1001.

Meanwhile, the second touch input information 1020 may include coordinate information for a second touch event defined by the second touch input 1032. Accordingly, as shown in the top drawing of FIG. 10B, when the second touch input applied to the touch screen 1012 of the second mobile terminal 1002 is dragged from a first point 1032a to a second point 1032b, the second touch input information 1020 may include information on the dragged coordinates of the second touch input.

Accordingly, the controller of the first mobile terminal 1001 may drag the coordinates of the second touch input mapped to the one point 1033a according to the received second touch input information 1020 to the other point 1033b corresponding to a point to which the second touch input has been dragged. Accordingly, a touch event corresponding to a second touch event (a dragged second touch input) applied to the touch screen 1012 of the second mobile terminal 1002 may be mapped onto the first touch screen 1011 of the first mobile terminal 1001.

Then, the controller 180 of the first mobile terminal 100 may generate a multi-touch event based on the first touch event defined from the first touch input 1031 applied to the first touch screen 151 and the mapped second touch event.

In this case, as shown in an upper drawing of FIG. 10B, even when the first touch input 1031 is not moved, the second touch input 1033b mapped by the mapped second touch event and the first touch input 1031 may generate a pinch-out input in which two touch inputs are dragged in a direction away from each other. Accordingly, as shown in the bottom drawing of FIG. 10B, the controller 180 of the first mobile terminal 1001 may enlarge and display screen information, that is, map information, displayed on the first touch screen 1011 according to the generated pinch-out input. In this case, the controller 180 of the first mobile terminal 1001 may enlarge the screen information with respect to the point 1031 to which the first touch input is applied.

Meanwhile, in the case of FIGS. 10A and 10B, when sizes of the display regions according to sizes of the touch screens and sizes of the displayed screen information in the first and second mobile terminals 1001, 1002 are the same, a touch trace size of the second touch event may not be adjusted. However, when the touch screens 1011, 1012 of the first and second mobile terminals 1001 and 1002 have different sizes of display regions or different sizes of displayed screen information, scale information for adjusting the touch trace size of the second touch event may be included in the second touch input information 1020.

Here, the scale information may directly include information on a scale to be changed, or may include information on a size of the display region according to a size of the touch screen of the mobile terminal on which the second touch event is detected, and a size of the displayed screen information to cause the controller of the mobile terminal that receives the second touch input information 1020 to adjust the touch trace of the second touch event.

Although the above description describes a case where execution screens of applications related to each other are displayed on two different touch screens, the present disclosure may also, of course, be applied to a mobile terminal having a single touch screen.

For example, the touch screen may be divided into a plurality of regions, and execution screens of different applications may be simultaneously displayed in different regions. In this case, a touch input applied to each region may be input as an input of an application for which an execution screen is displayed in each region, and in this case, the present disclosure described above may be applied.

Figure 11:
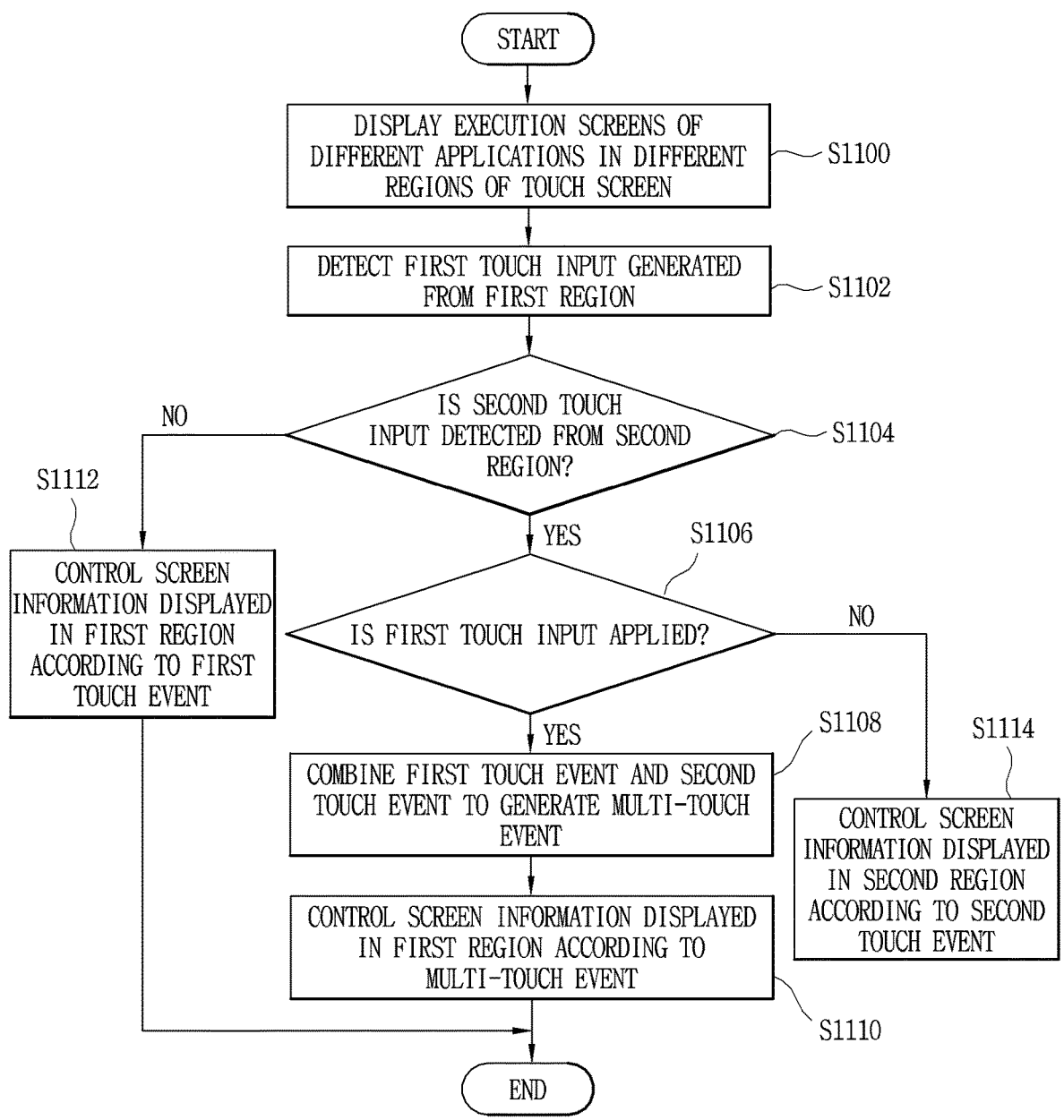
FIG. 11 is a flowchart illustrating an operation process in which a multi-touch function is performed according to a touch input applied to a first region and a touch input applied to a second region in a mobile terminal in which execution screens of different applications are displayed according to an embodiment of the present disclosure.

FIG. 11 is a flowchart illustrating an operation process in which a multi-touch function is performed according to a touch input applied to a first region and a touch input applied to a second region when execution screens of different applications are displayed in different regions on a touch screen of a mobile terminal.

Referring to FIG. 11, first, the controller 180 of the mobile terminal may divide the touch screen 151 into a plurality of regions, and execute a plurality of applications to display execution screens of different applications in different regions (S1100).

In this state, the controller 180 may detect a touch input (first touch input) applied to a first region (S1102). Furthermore, when a first touch input is detected, a second touch input applied to a second region different from the first region may be detected (S1104).

In this case, the controller 180 may determine whether the second touch input has been detected for a preset time period, and determine that the second touch input has not been applied when the second touch input has not been detected within the preset time period.

Meanwhile, when the second touch input is not detected in the second region as a result of the detection in step S1104, the controller 180 may control screen information displayed in the first region according to the first touch event defined by the first touch input (S1112). That is, when no other touch input is applied to the second region while the first touch input is applied to the first region, the controller 180 may determine the first touch event defined by the first touch input as an input of an application corresponding to the execution screen displayed in the first region. Accordingly, information on the execution screen of the application displayed in the first region may be controlled according to the first touch event.

On the contrary, when the second touch input is detected in the second region as a result of the detection in step S1104, the controller 180 may detect whether the second touch input is applied while the first touch input is being applied (S1106).

As a result of the detection in step S1106, when the second touch input is applied while the first touch input is not applied, the controller 180 may determine the second touch input as an input to the second region. Here, the second region may be a region in which an execution screen of an application different from that of the first region is displayed. In this case, the controller 180 may determine the second touch event defined by the second touch input as an input of an application corresponding to the execution screen displayed in the second region. Accordingly, information on the execution screen of the application displayed in the second region may be controlled according to the second touch event (S1114).

However, as a result of the detection in step S1106, when the second touch event is applied while the first touch input is applied, that is, when touch inputs defining the first touch event and the second touch event are simultaneously applied to the first and second regions on which execution screens of different applications are displayed, the controller 180 may combine the first touch event and the second touch event to generate a multi-touch event (S1108).

Meanwhile, in step S1108, the controller 180 may combine the first touch event and the second touch event into a multi-touch input applied to the first region. To this end, the controller 180 may map the second touch event to the first region. Accordingly, the mapped second touch event and the first touch event may be combined as a multi-touch input applied to the first region. Then, the controller 180 may determine that a multi-touch event according to the multi-touch input has been generated for the first region.

In step S1108, the controller 180 may first map the coordinates of a touch trace corresponding to the second touch event onto the first region. Here, the controller 180 may map a starting point of the coordinates corresponding to the touch trace to the vicinity of a point to which the first touch input is applied in the first region. In addition, the coordinates of the touch trace of the second touch input defined by the second touch input may be sequentially mapped onto the first region using the mapped coordinates as the starting point.

Here, the vicinity of the point to which the first touch input is applied may denote a point within a preset distance from the point to which the first touch input is applied. More preferably, the controller 180 may determine the coordinates of a starting point of the second touch event corresponding to the second touch input according to relative positions of the first region and the second region.

Furthermore, when the coordinates of the touch trace corresponding to the second touch event are mapped onto the first region, the controller 180 may define a multi-touch event according to the first touch event defined from the first touch input and the mapped second touch event.

When the multi-touch event is generated as described above, the controller 180 may control screen information displayed in the first region according to the generated multi-touch event. In this case, as described above, since the first touch event and the second touch event are combined as a multi-touch input for the first region, the controller 180 may control screen information displayed in the first region according to the multi-touch event.

As an example, when the multi-touch event defines a pinch-in or pinch-out input that is dragged in a direction toward or away from each other, the controller 180 may execute a function of reducing or enlarging screen information displayed in the first region according to the defined multi-touch event, that is, a pinch-in or pinch-out.

In this case, the controller 180 may perform a function according to the multi-touch event with respect to a point to which the first touch input is first applied. That is, when the multi-touch event defines a pinch-in or pinch-out, screen information displayed in the first region may be reduced or enlarged based on a point at which the first touch input is first detected in the first region.

Figure 12A:
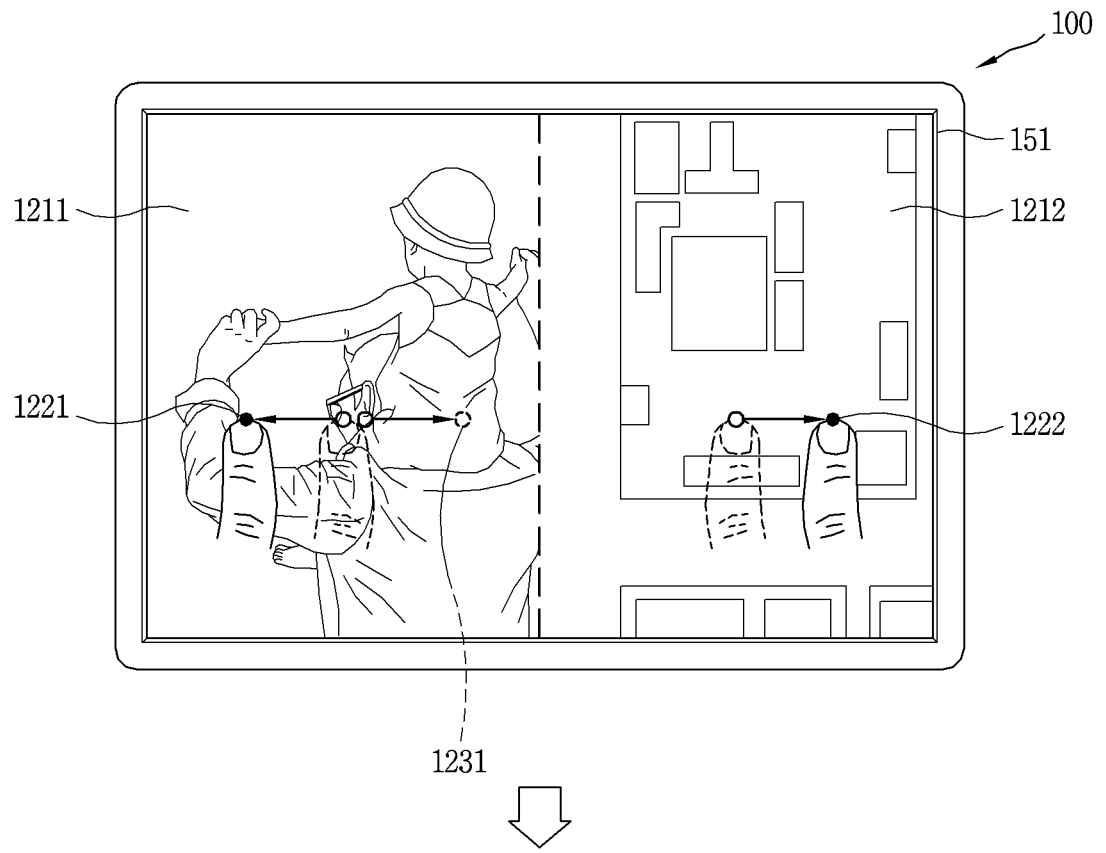
FIGS. 12A to 12C are exemplary views illustrating examples in which a multi-touch function is performed according to a touch input applied to a first region and a touch input applied to a second region in a mobile terminal in which execution screens of different applications are displayed according to an embodiment of the present disclosure.
Figure 12A:
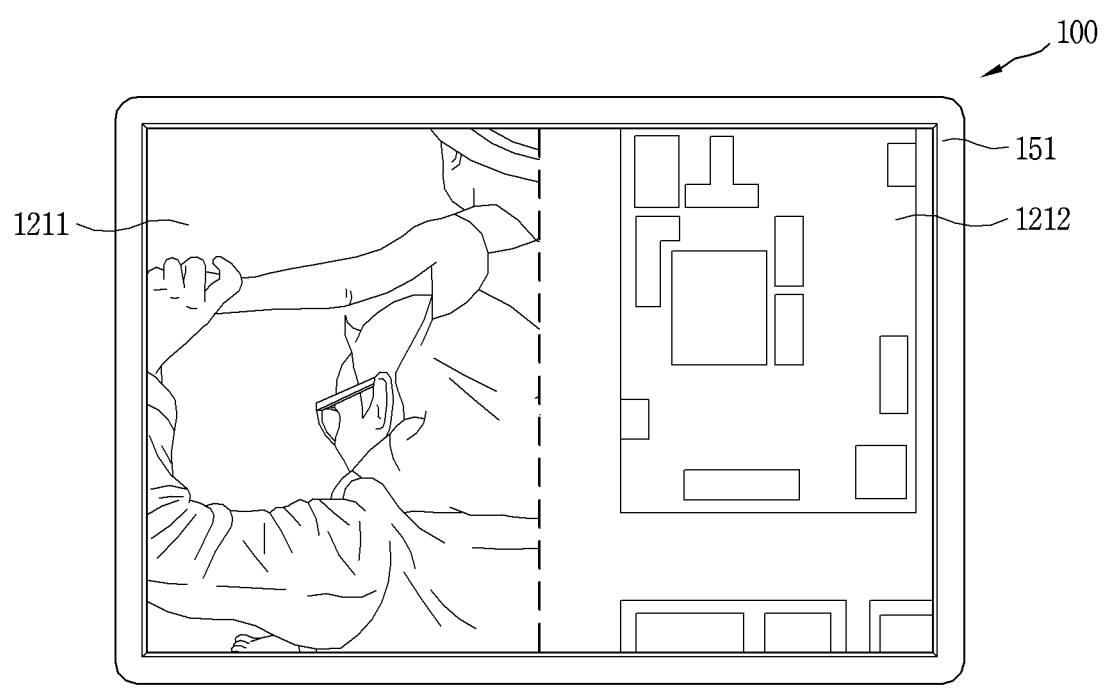
Figure 12B:
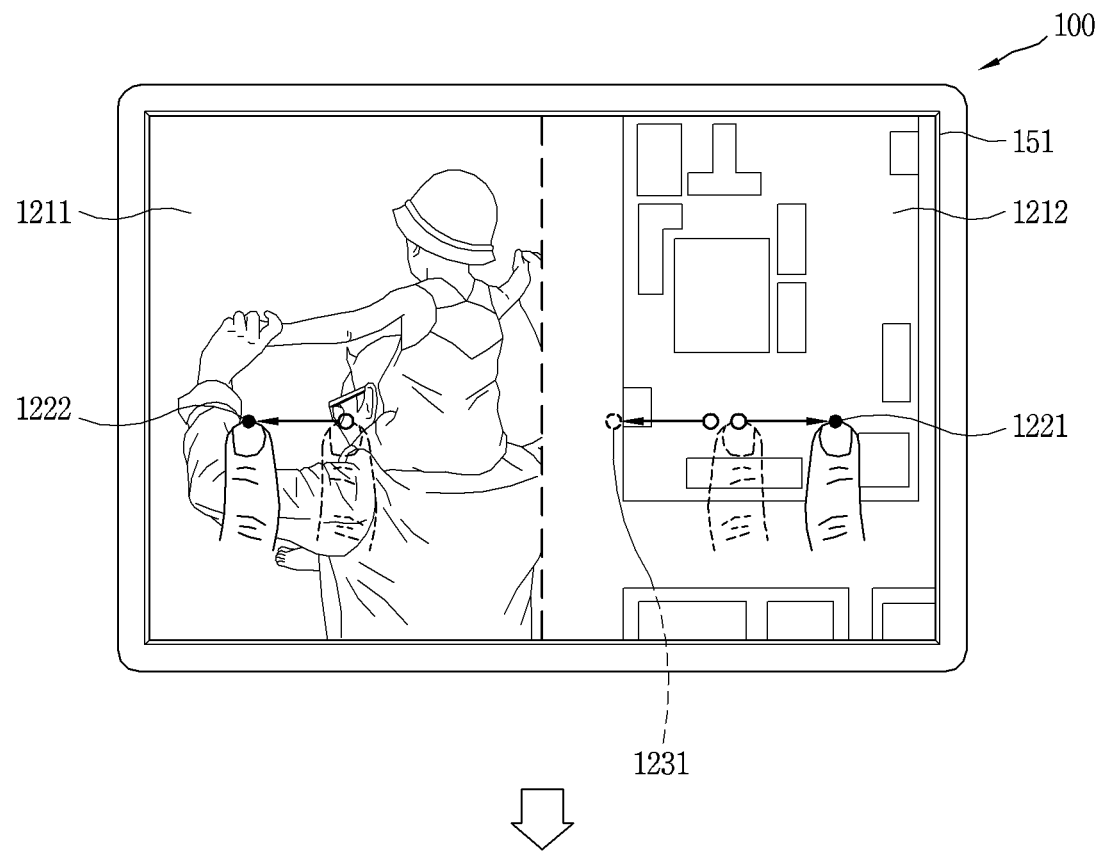
Figure 12B:
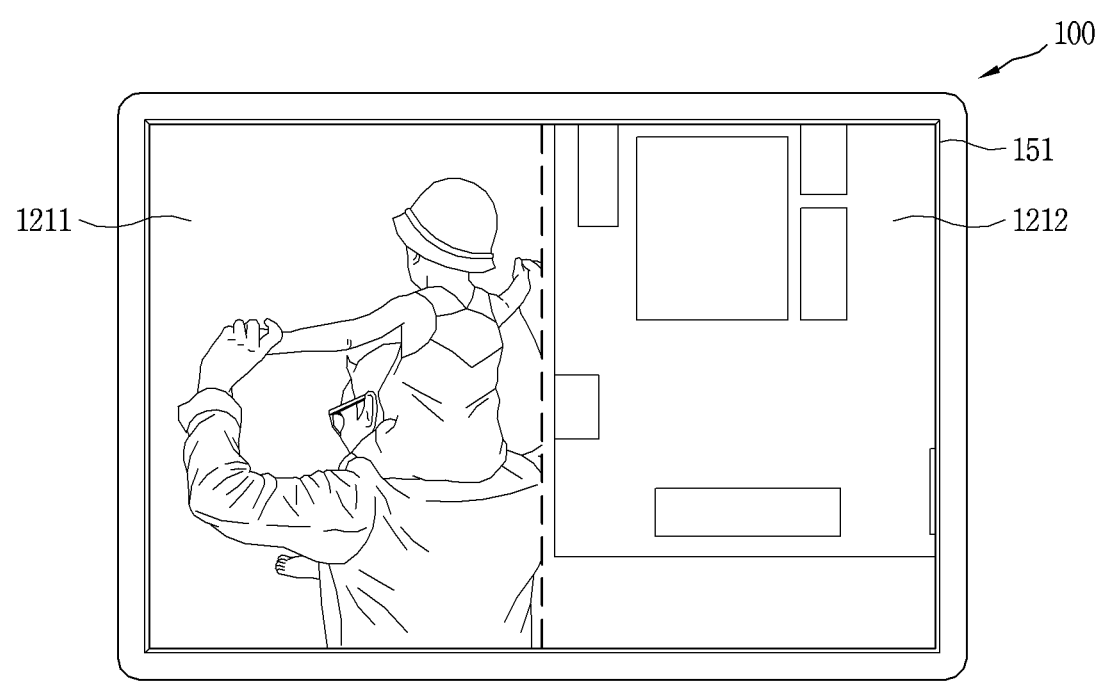
Figure 12C:
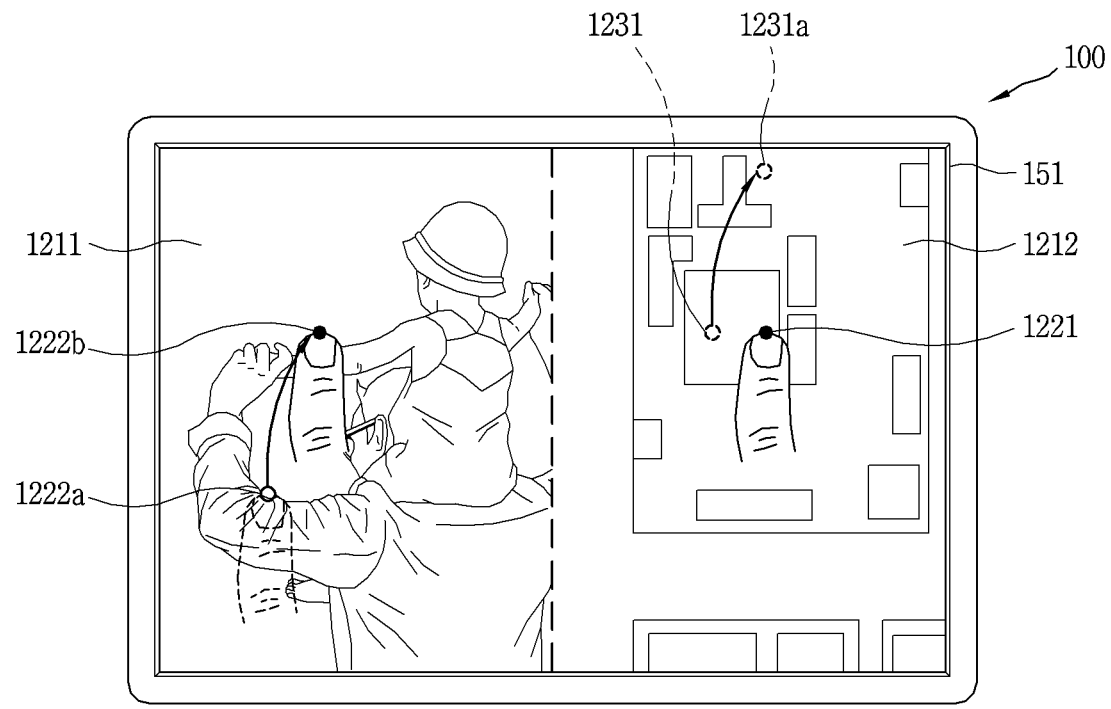
Figure 12C:
Figure 12C:

FIGS. 12A to 12C are exemplary views illustrating examples in which a multi-touch function is performed according to a touch input applied to a first region and a touch input applied to a second region in a mobile terminal in which execution screens of different applications are displayed according to an embodiment of the present disclosure.

First, FIGS. 12A to 12C illustrate examples in which execution screens of different applications are displayed in each region when the touch screen 1210 is divided into a first region 1211 and a second region 1212.

As an example, when the user executes a gallery application and selects any one of photo images, the controller 180 may divide the touch screen 151 into a plurality of regions as shown in FIGS. 12A to 12C, and display the selected photo image in either one region 1211 (first region), and map information indicating a location where the photo image was captured in the other region 1212 (second region). In this case, an execution screen of the gallery application (first application) may be displayed in the first region 1211, and an execution screen of a navigation application (second application) may be displayed in the second region 1212.

Referring first to FIG. 12A, as shown in the top drawing of FIG. 12A, a first touch input 1221 may be first applied to the first region 1211. In addition, while the first touch input 1221 is applied, a second touch input 1222 may be applied to the second region 1212.

In this case, the controller 180 of the mobile terminal 100 according to an embodiment of the present disclosure may map coordinates 1231 corresponding to the second touch input 1222 to the first region 1211. In this state, when the second touch input 1222 applied to the second region 1212 is dragged to generate a second touch event, the controller 180 may map at least one coordinates corresponding to a trace in which the second touch input 1222 has been dragged to the first region 1211. Accordingly, a touch trace corresponding to the second touch event may be mapped to the first region 1211.

When the touch trace corresponding to the second touch event is mapped to the first region 1211 as described above, the controller 180 may define a multi-touch input according to the first touch input 1221 defined based on a drag of the first touch input 1221 and the mapped touch trace. In this case, as shown in the top drawing of FIG. 12A, when the coordinates 1231 of the mapped second touch input and the first touch input 1221 move away from each other according to the first touch event and the mapped touch trace, the controller 180 may determine that the first touch event and the mapped touch trace defines a pinch-out input. In addition, a multi-touch event corresponding to the pinch-out input may be generated.

Accordingly, as shown in the bottom drawing of FIG. 12A, according to the first touch input 1221 applied to the first region 1211 and the second touch input 1222 applied to the second region 1212, screen information displayed in the region 1211, that is, an execution screen (photo image) of the first application may be enlarged and displayed.

Meanwhile, contrary to the case of FIG. 12A, FIG. 12B illustrates an example in which the first touch input 1221 is first applied to the second region 1212, and the second touch input 1222 is applied to the first region 1211 while the first touch input 1221 is applied.

In this case, the controller 180 of the mobile terminal 100 according to an embodiment of the present disclosure may map coordinates 1231 corresponding to the second touch input 1222 to the second region 1212 as shown in the top drawing of FIG. 12B.

Furthermore, when the second touch input 1222 applied to the first region 1211 is dragged to generate a second touch event, the controller 180 may map at least one coordinates corresponding to a trace in which the second touch input 1222 has been dragged to the second region 1212. Accordingly, a touch trace corresponding to the second touch event may be mapped to the second region 1212.

When the touch trace corresponding to the second touch event is mapped to the second region 1212 as described above, the controller 180 may define a multi-touch input according to the first touch input 1221 defined based on a drag of the first touch input 1221 and the mapped touch trace. In this case, as shown in the top drawing of FIG. 12B, when the coordinates 1231 of the mapped second touch input and the first touch input 1221 move away from each other according to the first touch event and the mapped touch trace, the controller 180 may determine that the first touch event and the mapped touch trace defines a pinch-out input. In addition, a multi-touch event corresponding to the pinch-out input may be generated.

Accordingly, as shown in the bottom drawing of FIG. 12B, according to the second touch input 1222 applied to the first region 1211 and the first touch input 1221 applied to the second region 1212, screen information displayed in the second region 1212, that is, an execution screen (map image) of the second application may be enlarged and displayed.

Meanwhile, FIG. 12C illustrates another example in which screen information displayed in a region to which a first touch input is applied is controlled according to a touch trace of a mapped second touch event.

First, as shown in the top drawing of FIG. 12C, when the second touch input is applied to the first region 1211 (point "a" 1222a) while the first touch input 1221 is applied to the second region 1212, the controller 180 may map coordinates corresponding to the second touch input to a first point 1231a in the second region 1212. Here, the first point 1231a may be around a point to which the first touch input 1221 is applied, as shown in the top drawing of FIG. 12C.

In this state, when the second touch input is dragged from the position "a" 1222a to a position "b" 1222b to define a second touch event, the controller 180 may map coordinates corresponding to a trace of the second touch event to the second region 1212. Accordingly, coordinates from the first point 1231a to the second point 1231a may be mapped onto the second region 1212 according to a trace of the second touch input.

Meanwhile, while the second touch input is dragged from the point "a" 1222a to the point "b" 1222b, the first touch input 1231 may be in a fixed state. In this case, the controller 180 may determine that the first touch input 1231 is a touch event for holding screen information. Accordingly, the controller 180 may determine the first touch event defined by the held first touch input 1231 and the dragged second touch event as a multi-touch input for rotating screen information.

Then, the controller 180 may rotate and display a region to which the first touch input 1231 is applied in a direction in which the coordinates are mapped according to the trace of the second touch input with respect to a point at which the first touch input 1231 is held, that is, screen information (the execution screen of the second application) displayed in the second region 1212. Accordingly, as shown in the bottom drawing of FIG. 12C, the image information of the second region 1212 may be rotated by a predetermined angle.

The foregoing present disclosure may be implemented as codes readable by a computer on a medium written by the program. The computer-readable media includes all types of recording devices in which data readable by a computer system can be stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

The invention claimed is:

1. A mobile terminal comprising:
a first touch screen that displays screen information on an executed application;
a communication unit that communicates with a second touch screen interworking with the first touch screen; and
a controller that combines a first touch event defined by a first touch input and a second touch event defined by a second touch input to generate a multi-touch event, and performs a function according to the multi-touch event for screen information displayed on the first touch screen to which the first touch input is applied when the second touch input is applied to the second touch screen while the first touch input is applied to the first touch screen,
wherein the controller is further configured to:
when the second touch input is applied while the first touch input is applied, perform a first mapping of coordinates corresponding to the second touch input to the first touch screen to which the first touch input is applied;
perform a second mapping of the second touch event according to the second touch input to the second touch screen using the mapped coordinates as a starting point; and
combine the mapped second touch event and the first touch event applied to the first touch screen.

2. The mobile terminal of claim 1, wherein when a pinch-output input is defined in which the first touch input and the second touch input defining the mapped second touch event are dragged in a direction away from each other, or a pinch-in input is defined in which the first and second touch inputs are dragged in a direction toward each other, the controller enlarges or reduces an execution screen displayed on the touch screen to which the first touch input is applied according to the pinch-out input or the pinch-in input.

3. The mobile terminal of claim 1, wherein when the second touch input is applied to the second touch screen while the first touch input is applied to the first touch screen,
the controller performs the first mapping of coordinates on the first touch screen to which the first touch input is applied, that are corresponding to coordinates at which the second touch input is applied to the second touch screen, as the starting point, and
wherein when a touch trace is formed from the second touch input, the controller performs the second mapping of a touch trace corresponding to the touch trace formed by the second touch input from the starting point.

4. The mobile terminal of claim 3, wherein the controller determines the coordinates of the starting point mapped to a proximity of one point on the either one touch screen according to relative positions of the first touch screen to which the first touch input is applied and the second touch screen to which the second touch input is applied.

5. The mobile terminal of claim 1, wherein the second touch screen is provided in a case coupled to the mobile terminal, and
wherein the case displays an execution screen of an application executed in the mobile terminal on the second touch screen interworking with the first touch screen based on a touch input applied to the first touch screen or the second touch screen.

6. The mobile terminal of claim 1, wherein the second touch screen is provided in another mobile terminal separate from the mobile terminal, on which an execution screen of the same application as that of screen information displayed on the first touch screen is displayed, and
wherein the controller is further configured to:
transmit information on the second touch event applied to the first touch screen to the mobile terminal having the second touch screen when the first touch input is applied to the second touch screen; and
receive information on the second touch event from the mobile terminal having the second touch screen to generate the multi-touch event when the first touch input is applied to the first touch screen.

7. The mobile terminal of claim 1, wherein the controller performs a function according to the multi-touch event with respect to one point on the first touch screen to which the first touch input is applied, and
wherein the one point on the touch screen to which the first touch input is applied is a point to which the first touch input is first applied.

8. A mobile terminal comprising:
a touch screen divided into a plurality of regions to display execution screens of different applications in each region; and
a controller that combines a first touch input and a second touch input to generate a multi-touch event, and performs a function according to the multi-touch event with respect to one point on a first region to which the first touch input is applied when the second touch input is applied to a second region on the touch screen on which an execution screen of a second application is displayed while the first touch input is applied to the first region on the touch screen on which an execution screen of a first application is displayed,
wherein the controller is further configured to:
when the second touch input is applied while the first touch input is applied, map perform a first mapping of coordinates corresponding to the second touch input to the first region to which the first touch input is applied,
perform a second mapping of a second touch event defined by the second touch input to the first region using the mapped coordinates as a starting point, and
combine a first touch event defined by the first touch input applied to the first region and the second touch event mapped to the first region.

9. The mobile terminal of claim 8, wherein the coordinates corresponding to the second touch input mapped to one point on the first region is a point within a predetermined distance from a point where the first touch input is first applied in the first region.

10. The mobile terminal of claim 8, wherein when the first touch event and the mapped second touch event define a pinch-in or pinch-out input, the controller reduces or enlarges an execution screen of the first application according to the pinch-in or pinch-out input.

11. The mobile terminal of claim 8, wherein when the second touch input dragged in one direction is applied while the first touch input is held, screen information displayed through the execution screen of the first application is rotated according to a direction in which the second touch input is dragged with respect to a point at which the first touch input is held.

* * * * *